(12) United States Patent
Taguchi et al.

(10) Patent No.: US 7,125,444 B2
(45) Date of Patent: Oct. 24, 2006

(54) INKJET INK

(75) Inventors: Toshiki Taguchi, Shizuoka (JP);
Naotaka Wachi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 308 days.

(21) Appl. No.: 10/807,294

(22) Filed: Mar. 24, 2004

(65) Prior Publication Data

US 2004/0194661 A1 Oct. 7, 2004

(30) Foreign Application Priority Data

Mar. 24, 2003 (JP) ............ P. 2003-080222
Feb. 16, 2004 (JP) ............ P. 2004-037864

(51) Int. Cl.
*C09D 11/02* (2006.01)

(52) U.S. Cl. ............ 106/31.46; 106/31.47; 106/31.49

(58) Field of Classification Search ........ 106/31.46, 106/31.47, 31.49
See application file for complete search history.

(56) References Cited

U.S. PATENT DOCUMENTS 6,582,501 B1 * 6/2003 Ryu et al. .......... 106/31.46
2004/0187734 A1 * 9/2004 Ozawa et al. ....... 106/31.27
2005/0178288 A1 * 8/2005 Taguchi ............. 106/31.13

* cited by examiner

*Primary Examiner*—Helene Klemanski
(74) *Attorney, Agent, or Firm*—Sughrue Mion, PLLC

(57) ABSTRACT

An inkjet ink comprising at least one dye having a heterocyclic ring and a metal ion in an aqueous medium, wherein the ink jet ink further comprises a compound capable of accelerating aggregation of the dye in the aqueous medium.

6 Claims, No Drawings

INKJET INK

FIELD OF THE INVENTION

The present invention relates to an inkjet ink, and particularly to an inkjet ink, which provides a recording image of high quality, and which is excellent in ejection stability and preservability of image formed, for example, resistance to light, heat and ozone gas.

BACKGROUND OF THE INVENTION

With the popularization of computers in recent years, inkjet printers are widely used not only at offices but also at homes for printing letters or images on paper, films, cloths or the like.

The inkjet recording method includes a system of ejecting a liquid droplet upon applying a pressure by means of a piezoelectric element, a system of ejecting a liquid droplet by generating a bubble in an ink upon heat, a system of using an ultrasonic wave, and a system of ejecting a liquid droplet by drawing with an electrostatic force. An ink for use in such inkjet recording methods includes an aqueous ink, an oily ink and a solid (melt-type) ink. Of these inks, the aqueous ink becomes mainstream in view of production, handleability, odor, safety and the like.

A coloring agent used in such an ink for inkjet recording method is required to have high solubility in a solvent, enable high-density recording, have good color hue, exhibit excellent fastness to light, heat, air, ozone, water and chemicals, ensure good fixing property and less bleeding on an image-receiving material, provide an ink having excellent preservability, shows no toxicity, have high purity, and be available at a low cost. However, it is very difficult to find out a coloring agent satisfying these requirements at a high level. In particular, a coloring agent having good cyan color hue and excellent fastness to ozone is strongly desired.

Although various dyes and pigments for inkjet recording have been already proposed and practically used, a coloring agent satisfying all requirements is not yet found out at present. Conventionally well-known dyes and pigments such as those having a Colour Index (C.I.) number can hardly satisfy both color hue and fastness required to the ink for inkjet recording method.

The inventors have made technical searches for resolving the above-described problems in the inkjet ink using dye and found that an aqueous inkjet ink is many times particularly interior in image preservability due to water solubility of the dye. As dyes suitable for the aqueous inkjet ink, phthalocyanine dyes having specific structures are set forth in Patent Documents 1 to 3 described below. These techniques exhibit improvements in simultaneous pursuit of color hue and fastness. However, since the color hue and fastness are especially important characteristics together with ejection stability, further improvements have been desired.

Patent Document 1: JP-A-2003-3086 (the term "JP-A" as used herein means an "unexamined published Japanese patent application")

Patent Document 2: JP-A-2003-3099

Patent Document 3: JP-A-2003-3109

SUMMARY OF THE INVENTION

An object of the present invention is to provide an inkjet ink, which provides a recording image of high quality, and which is excellent in ejection stability and preservability of image formed, for example, resistance to light, heat and ozone gas.

Other objects of the invention will become apparent from the following description.

The objects of the invention can be attained by the inkjet ink described in items 1 to 5 below.

1) An inkjet ink comprising at least one dye having a heterocyclic ring and a metal ion in an aqueous medium, wherein the ink jet ink further comprises a compound capable of accelerating aggregation of the dye in the aqueous medium.

2) The inkjet ink as described in item 1) above, wherein the dye having a heterocyclic ring and a metal ion is a phthalocyanine dye.

3) The inkjet ink as described in item 1) or 2) above, wherein the compound capable of accelerating aggregation of the dye in the aqueous medium is at least one compound selected from heterocyclic or chain-like low molecular weight compounds that may be substituted with a hydroxy group, an amino group or a thiazolyl group.

4) The inkjet ink as described in item 1) or 2) above, wherein the dye having a heterocyclic ring and a metal ion is at least one of dyes represented by formula (I) shown below.

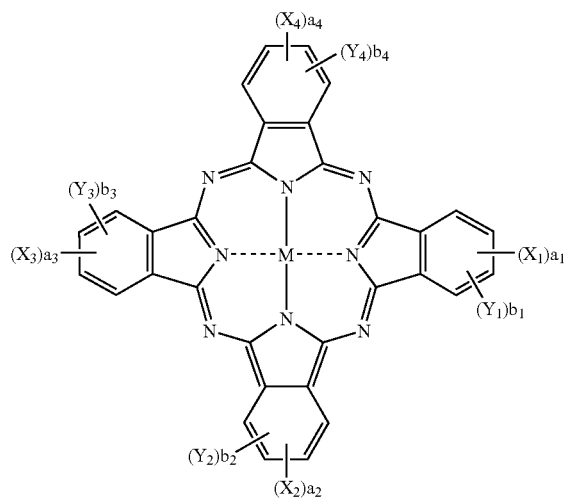

(I)

In formula (I) above, $X_1$, $X_2$, $X_3$ and $X_4$ each independently represent —SO-Z, —SO$_2$-Z, —SO$_2$NR$_1$R$_2$, a sulfo group, —CONR$_1$R$_2$ or —CO$_2$R$_1$. Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group. $R_1$ and $R_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group. When two or more Zs are present, these may be the same or different from each other. $Y_1$, $Y_2$, $Y_3$ and $Y_4$ each independently represent a monovalent substituent. When two or more of any one of $X_1$s to $X_4$s and $Y_1$s to $Y_4$s are present, these may be the same or different from each other. $a_1$, $a_2$, $a_3$ and $a_4$ and $b_1$, $b_2$, $b_3$ and $b_4$ represent numbers of substituents represented by $X_1$ to $X_4$ and $Y_1$ to $Y_4$, respectively. $a_1$ to $a_4$ each independently represent an integer of from 0 to 4, provided that all of $a_1$ to $a_d$ are not 0 at the same time. $b_1$ to $b_4$ each independently represent an integer of from 0 to 4. M represents a hydrogen atom, a metal element or an oxide, hydroxide or halide thereof.

5) The inkjet ink as described in item 4) above, wherein the dye represented by formula (I) is a dye represented by formula (II) shown below.

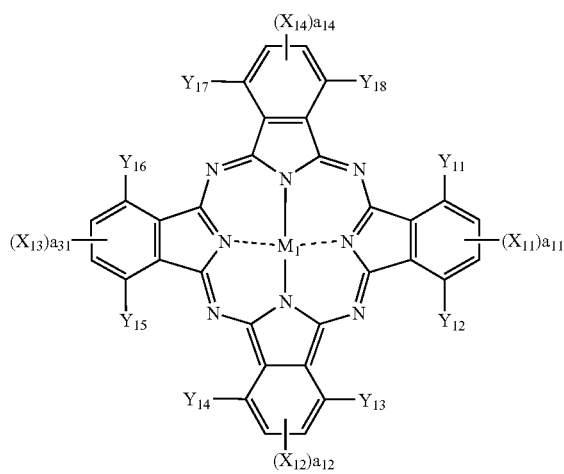

In formula (II) above, $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$, $Y_{18}$ and $M_1$ have the same meanings as defined for $X_1$ to $X_4$, $Y_1$ to $Y_4$ and M in formula (I), respectively. $a_{11}$ to $a_{14}$ each independently represent an integer of from 1 or 2.

DETAILED DESCRIPTION OF THE INVENTION

According to the invention, among aqueous inks advantageous in view of handleability, odor, safety and the like, an inkjet ink, which provides a recording image of high quality, and which is excellent in ejection stability and preservability of image formed, for example, resistance to light, heat and ozone gas is provided.

The present invention is described in detail below.

The inkjet ink of the invention is characterized by containing a dye having a heterocyclic ring and a metal ion and a compound capable of accelerating aggregation of the dye. The coexistence of the dye and the compound can provide an inkjet ink that satisfies both high quality of a recording image and preservability of the image formed, for example, resistance to light, heat and ozone gas and is excellent in ejection stability.

According to the inkjet ink of the invention, when the dye is a phthalocyanine dye, in particular, a specific phthalocyanine dye represented by formula (I), the advantages of satisfying both high quality of a recording image and preservability of the image formed, for example, resistance to light, heat and ozone gas and also excellent ejection stability is more effectively achieved.

First, the phthalocyanine dye represented by formula (I) shown below for use in the invention will be described in detail below.

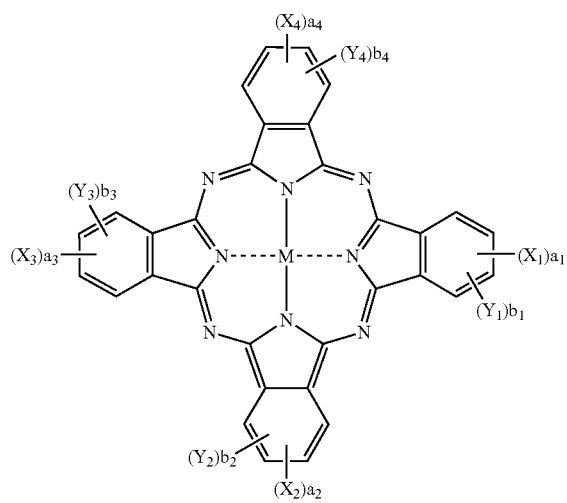

In formula (I), $X_1$, $X_2$, $X_3$ and $X_4$ each independently represent —SO-Z, —SO$_2$-Z, —SO$_2$NR$_1$R$_2$, a sulfo group, —CONR$_1$R$_2$ or —CO$_2$R$_1$. Among the substituents, —SO-Z, —SO$_2$-Z, —SO$_2$NR$_1$R$_2$ and —CONR$_1$R$_2$ are preferred, —SO$_2$-Z and —SO$_2$NR$_1$R$_2$ are more preferred and —SO$_2$-Z is most preferred. In the case where $a_1$ to $a_4$ each indicating the number of substituents each represent a number of 2 or more, a plurality of substituents of $X_1$, $X_2$, $X_3$ or $X_4$ may be the same or different and each independently represent any one of the above-described substituents. Also, $X_1$, $X_2$, $X_3$ and $X_4$ may be completely the same substituents, may be substituents of the same kind but partially different from each other, for example, as a case where $X_1$, $X_2$, $X_3$ and $X_4$ all represent —SO$_2$-Z but the Zs are different, or may include substituents different from each other, for example, —SO$_2$-Z and —SO$_2$NR$_1$R$_2$.

Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_1$ and $R_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group, preferably a hydrogen atom, a substituted or unsubstituted alkyl group, a substituted or unsubstituted aryl group or a substituted or unsubstituted heterocyclic group, and more preferably a hydrogen atom, a substituted alkyl group, a substituted aryl group or a substituted heterocyclic group. However, it is not preferred that both $R_1$ and $R_2$ are hydrogen atoms.

The substituted or unsubstituted alkyl group represented by $R_1$, $R_2$ or Z is preferably an alkyl group having from 1 to 30 carbon atoms. In view of improvements in the solubility of dye and the stability of ink, a branched alkyl group is more preferable and an alkyl group having an asymmetric carbon (use in a racemic form) is particularly preferable. Examples of the substituent include those described hereinafter as a substituent when Z, $R_1$, $R_2$, $Y_1$, $Y_2$, $Y_3$ and $Y_4$ further have a substituent. Among the substituents, a hydroxy group, an ether group, an ester group, a cyano group, an amido group and a sulfonamido group are particularly preferred because the aggregation property and fastness of the dye are improved. Further, the alkyl group may be substituted with a halogen atom or an ionic hydrophilic group. The number of carbon atoms in the alkyl group described above does not contain a number of carbon atoms included in the substituent. The same is also applied to the other groups.

The substituted or unsubstituted cycloalkyl group represented by $R_1$, $R_2$ or Z is preferably a cycloalkyl group having from 5 to 30 carbon atoms. In view of improvements in the solubility of dye and the stability of ink, a cycloalkyl group having an asymmetric carbon (use in a racemic form) is particularly preferable. Examples of the substituent include those described hereinafter as a substituent when Z, $R_1$, $R_2$, $Y_1$, $Y_2$, $Y_3$ and $Y_4$ further have a substituent. Among the substituents, a hydroxy group, an ether group, an ester group, a cyano group, an amido group and a sulfonamido group are particularly preferred because the aggregation property and fastness of the dye are improved. Further, the cycloalkyl group may be substituted with a halogen atom or an ionic hydrophilic group.

The substituted or unsubstituted alkenyl group represented by $R_1$, $R_2$ or Z is preferably an alkenyl group having from 2 to 30 carbon atoms. In view of improvements in the solubility of dye and the stability of ink, a branched alkenyl group is more preferable and an alkenyl group having an asymmetric carbon (use in a racemic form) is particularly preferable. Examples of the substituent include those described hereinafter as a substituent when Z, $R_1$, $R_2$, $Y_1$, $Y_2$, $Y_3$ and $Y_4$ further have a substituent. Among the substituents, a hydroxy group, an ether group, an ester group, a cyano group, an amido group and a sulfonamido group are particularly preferred because the aggregation property and fastness of the dye are improved. Further, the alkenyl group may be substituted with a halogen atom or an ionic hydrophilic group.

The substituted or unsubstituted aralkyl group represented by $R_1$, $R_2$ or Z is preferably an aralkyl group having from 7 to 30 carbon atoms. In view of improvements in the solubility of dye and the stability of ink, a branched aralkyl group is more preferable and an aralkyl group having an asymmetric carbon (use in a racemic form) is particularly preferable. Examples of the substituent include those described hereinafter as a substituent when Z, $R_1$, $R_2$, $Y_1$, $Y_2$, $Y_3$ and $Y_4$ further have a substituent. Among the substituents, a hydroxy group, an ether group, an ester group, a cyano group, an amido group and a sulfonamido group are particularly preferred because the aggregation property and fastness of the dye are improved. Further, the aralkyl group may be substituted with a halogen atom or an ionic hydrophilic group.

The substituted or unsubstituted aryl group represented by $R_1$, $R_2$ or Z is preferably an aryl group having from 6 to 30 carbon atoms. Examples of the substituent include those described hereinafter as a substituent when Z, $R_1$, $R_2$, $Y_1$, $Y_2$, $Y_3$ and $Y_e$ further have a substituent. Among the substituents, an electron-withdrawing group is particularly preferred because the electron-withdrawing group makes an oxidation potential of the dye noble to improve the fastness thereof. Examples of the electron-withdrawing group include groups having a positive Hammett's substituent constant op value. Among them, a halogen atom, a heterocyclic group, a cyano group, a carboxy group, an acylamino group, a sulfonamido group, a sulfamoyl group, a carbamoyl group, a sulfonyl group, an imido group, an acyl group, a sulfo group and a quaternary ammonium group are preferred, a cyano group, a carboxy group, a sulfamoyl group, a carbamoyl group, a sulfonyl group, an imido group, an acyl group, a sulfo group and a quaternary ammonium group are more preferred.

The heterocyclic group represented by $R_1$, $R_2$ or Z is preferably a 5-membered or 6-membered ring and the ring may further have a condensed ring. Also, the heterocyclic group may be an aromatic heterocyclic group or a non-aromatic heterocyclic group. Examples of the heterocyclic group represented by $R_1$, $R_2$ or Z are shown below in the form of a heterocyclic ring with omitting a substitution site. The substitution site should not be limited and, for example, in the case of pyridine, the 2-position, 3-position and 4-position thereof can be substituted. Examples of the heterocyclic ring include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. The heterocyclic groups each may have a substituent and examples of the substituent include those described hereinafter as a substituent when Z, $R_1$, $R_2$, $Y_1$, $Y_2$, $Y_3$ and $Y_4$ further have a substituent. Preferred examples of the substituent are same as the above-described preferred substituents for the aryl group and more preferred examples of the substituent are same as the above-described more preferred substituents for the aryl group.

$Y_1$, $Y_2$, $Y_3$ and $Y_4$ each independently represent a hydrogen atom, a halogen atom, an alkyl group, a cycloalkyl group, an alkenyl group, an aralkyl group, an aryl group, a heterocyclic group, a cyano group, a hydroxy group, a nitro group, an amino group, an alkylamino group, an alkoxy group, an aryloxy group, an acylamino group, an arylamino group, a ureido group, a sulfamoylaiaino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a phosphoryl group, an acyl group, a carboxy group or a sulfo group. These groups each may further have a substituent.

$Y_1$, $Y_2$, $Y_3$ and $Y_4$ each preferably represent a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxy group or a sulfo group, more preferably a hydrogen atom, a halogen atom, a cyano group, a carboxy group or a sulfo group, and most preferably a hydrogen atom.

When Z, $R_1$, $R_2$, $Y_1$, $Y_2$, $Y_3$ and $Y_4$ each represent a group that further have a substituent, the group may further have the following substituent.

Examples of the substituent include a straight-chain or branched alkyl group having from 1 to 12 carbon atoms, a straight-chain or branched aralkyl group having from 7 to 18 carbon atoms, a straight-chain or branched alkenyl group having from 2 to 12 carbon atoms, a straight-chain or branched alkynyl group having from 2 to 12 carbon atoms, a cycloalkyl group having from 3 to 12 carbon atoms, a cycloalkenyl group having from 3 to 12 carbon atoms. Of the groups, those having a branched chain are preferable because the solubility of dye and the stability of ink are improved, and a group having an asymmetric carbon is particularly preferred. Specific examples of the groups include a methyl group, an ethyl group, a propyl group, an isopropyl group, a sec-butyl group, a tert-butyl group, a 2-ethylhexyl group, a 2-methylsulfonylethyl group, a 3-phenoxypropyl group, a trifluoromethyl group, a cyclopentyl group, a halogen atom (e.g., chlorine or bromine), an aryl group (e.g., phenyl, 4-tert-butylphenyl or 2,4-di-tert-amylphenyl), a heterocyclic group (e.g., imidazolyl, pyrazolyl, triazolyl, 2-furyl, 2-thienyl, 2-pyrimidinyl or 2-benzothiazolyl), a cyano group, a hydroxy group, a nitro group, a carboxy group, an amino group, an alkyloxy group (e g., methoxy, ethoxy, 2-methoxyethoxy or 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy or 3-methoxycarbamoylphenoxy), an acylamino group (e.g., acetamido, benzamido or 4-(3-tert-butyl-4-hydroxyphenoxy)butanamido), an alkylamino group (e.g., methylamino, butylamino, diethylamino or methylbutylamino), an anilino group (e.g., phenylamino or 2-chloroanilino), a ureido group (e.g., phenylureido, methylureido or N,N-dibutylureido), a sulfamoylamino group (e.g., N,N-dipropylsulfamoylamino), an alkylthio group (e.g., methylthio, octylthio or 2-phenoxyethylthio), an arylthio group (e.g., phenylthio, 2-butoxy-5-tert-octylphenylthio or 2-carboxyphenylthio), an alkyloxycarbonylamino group (e.g., methoxycarbonylmino), a sulfonamido group (e.g., methanesulfonamido, benzenesulfonamido or p-toluenesulfonamido), a carbamoyl group (e.g., N-ethylcarbamoyl or N,N-dibutylcarbamoyl), a sulfamoyl group (e.g., N-ethylsulfamoyl, N,N-dipropylsulfamoyl or N-phenylsulfamoyl), a sulfonyl group (e.g., methanesulfonyl, octanesulfonyl, benzenesulfonyl or toluenesulfonyl), an alkyloxycarbonyl group (e.g., methoxycarbonyl or butyloxycarbonyl), a heterocyclicoxy group (e.g., 1-phenyltetrazol-5-oxy or 2-tetrahydropyranyloxy), an azo group (e.g., phenylazo, 4-methoxyphenylazo, 4-pivaloylaminophenylazo or 2-hydroxy-4-propanoylphenylazo), an acyloxy group (e.g., acetoxy), a carbamoyloxy group (e.g., N-methylcarbamoyloxy or N-phenylcarbamoyloxy), a silyloxy group (e.g., trimethylsilyloxy or dibutylmethylsilyloxy), an aryloxycarbonylamino group (e.g., phenoxycarbonylamino), an imido group (e.g., N-succinimido or N-phthalimido), a heterocyclicthio group (e.g., 2-benzothiazolylthio, 2,4-diphenoxy-1,3,5-triazole-6-thio or 2-pyridylthio), a sulfinyl group (e.g., 3-phenoxypropylsulfinyl), a phosphonyl group (e.g., phenoxyphosphonyl, octyloxyphosphonyl or phenylphosphonyl), an aryloxycarbonyl group (e.g., phenoxycarbonyl), an acyl group (e.g., acetyl, 3-phenylpropanoyl or benzoyl), and an ionic hydrophilic group (e.g., carboxy, sulfo, phosphono or quaternary ammonium).

In the case where the phthalocyanine dye represented by formula (I) is water-soluble, the dye preferably contains an ionic hydrophilic group. Examples of the ionic hydrophilic group include a sulfo group, a carboxy group, a phosphono group and a quaternary ammonium group. Among the ionic hydrophilic groups, a carboxy group, a phosphono group and a sulfo group are preferred, and a carboxy group and a sulfo group are particularly preferred. The carboxy group, phosphono group and sulfo group each may be in the state of salt and examples of the counter ion for forming the salt include an ammonium ion, an alkali metal ion (e.g., a lithium ion, a sodium ion or a potassium ion) and an organic cation (e.g., a tetramethylammonium ion, a tetramethylguanidium ion or a tetramethylphosphonium ion). Among the counter ions, an alkali metal salt is preferred and a lithium salt is more preferred because the solubility of dye and the stability of ink are improved.

As for the number of ionic hydrophilic groups, the phthalocyanine dye preferably contains at least two ionic hydrophilic groups, particularly preferably at least two sulfo groups and/or carboxy groups, per molecule.

$a_1$ to $a_4$ and $b_1$ to $b_4$ represent the number of substituents of $X_1$ to $X_4$ and $Y_1$ to $Y_4$, respectively. $a_1$ to $a_4$ each independently represent an integer of from 0 to 4 but all of them are not 0 at the same time. $b_1$ to $b_4$ each independently represent an integer of 0 to 4. When $a_1$, $a_2$, $a_3$, $a_4$, $b_1$, $b_2$, $b_3$ or $b_4$ represents a number of 2 or more, a plurality of substituents of $X_1$, $X_2$, $X_3$, $X_4$, $Y_1$, $Y_2$, $Y_3$ or $Y_4$ are present and the substituents may be the same or different.

$a_1$ and $b_1$ satisfy the relationship of $a_1+b_1=4$. In particular, a combination in that $a_1$ represents 1 or 2 and $b_1$ represents 3 or 2 is preferred, and a combination in that $a_1$ represents 1 and $b_1$ represents 3 is most preferred.

The relationship between $a_1$ and $b_1$ is also applied to each of the pairs of $a_2$ and $b_2$, $a_3$ and $b_3$ and $a_4$ and $b_4$, and the preferred combinations described above are also applied thereto.

M represents a hydrogen atom, a metal element or an oxide, hydroxide or halide thereof.

M is preferably a hydrogen atom, a metal element, for example, Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb or Bi, an oxide, for example, VO or GeO, a hydroxide, for example, $Si(OH)_2$, $Cr(OH)_2$ or $Sn(OH)_2$, and a halide, for example, AlCl, $SiCl_2$, VCl, $VCl_2$, VCl, FeCl, GaCl or ZrCl, more preferably Cu, Ni, Zn or Al, and most preferably Cu.

Also, Pc (phthalocyanine ring) may form a dimer (for example, Fc-M-L-M-Pc) or a trimer through L (divalent linking group). In such a case, the Ms may be the same or different.

The divalent linking group represented by L is preferably an oxy group (—O—), a thio group (—S—), a carbonyl group (—CO—), a sulfonyl group (—SO$_2$—), an imino group (—NH—), a methylene group (—CH$_2$—) or a group formed by combining two or more of these groups.

With respect to preferred combination of substituents in the compound represented by formula (I), a compound wherein at least one of various substituents is the above-described preferred group is preferred, a compound wherein a larger number of various substituents are the above-described preferred groups is more preferred, and a compound wherein all substituents are the above-described preferred groups is most preferred.

Of the phthalocyanine dyes represented by formula (I), a phthalocyanine dye having a structure represented by formula (II) shown below is more preferred.

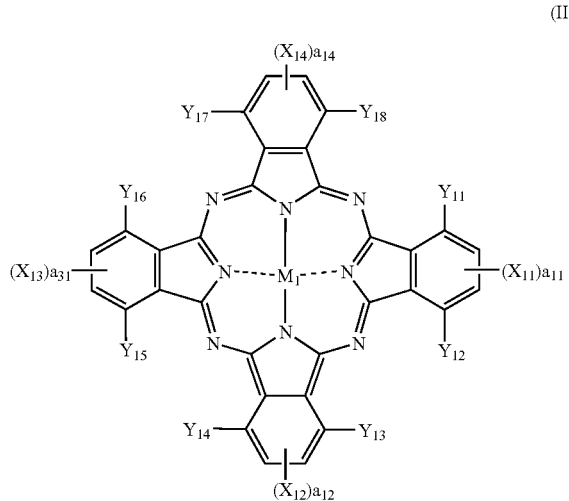

The phthalocyanine dye represented by formula (II) according to the invention is described in detail below.

In formula (II), $X_{11}$ to $X_{14}$ and $Y_{11}$ to $Y_{18}$ have the same meanings as defined for $X_1$ to $X_4$ and $Y_1$ to $Y_4$ in formula (I), respectively, and preferred examples thereof are also the same as those described above. $M_1$ has the same meaning as defined for M in formula (I) and preferred examples thereof are also the same as those described above.

In formula (II), $a_{11}$ to $a_{14}$ each independently represent an integer of 1 or 2. A case where a formula of $4 \leq a_{11}+a_{12}+a_{13}+a_{14} \leq 6$ is satisfied is preferred, and a case where a formula of $a_{11}=a_{12}=a_{13}=a_{14}=1$ is satisfied is particularly preferred.

$X_{11}$, $X_{12}$, $X_{13}$ and $X_{14}$ may be completely the same substituents, may be substituents of the same kind but partially different from each other, for example, as a case where $X_{11}$, $X_{12}$, $X_{13}$ and $X_{14}$ all represent —SO$_2$-Z but the Zs are different, or may include substituents different from each other, for example, —SO$_2$-Z and —SO$_2$NR$_1$R$_2$.

In the phthalocyanine dye represented by formula (II), the following combinations of substituents are particularly preferred.

$X_{11}$ to $X_{14}$ each independently represent preferably —SO-Z, —SO$_2$-Z, —SO$_2$NR$_1$R$_2$ or —CONR$_1$R$_2$, more preferably —SO$_2$-Z or —SO$_2$NR$_1$R$_2$, and most preferably —SO$_2$-Z.

Z represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, a case where an asymmetric carbon is present in the substituent (use in a racemic form) is preferred because the solubility of dye and the stability of ink are improved. Also, a case where a hydroxy group, an ether group, an ester group, a cyano group, an amido group or a sulfonamido group is present in the substituent is preferred because the aggregation property and fastness of the dye are improved.

$R_1$ and $R_2$ each independently represent preferably a hydrogen atom, a substituted or unsubstituted alkyl group, a substituted or unsubstituted aryl group or a substituted or unsubstituted heterocyclic group, and more preferably a hydrogen atom, a substituted alkyl group, a substituted aryl group or a substituted heterocyclic group. However, it is not preferred that both $R_1$ and $R_2$ are hydrogen atoms. In particular, a case where an asymmetric carbon is present in the substituent (use in the racemic form) is preferred because the solubility of dye and the stability of ink are improved. Also, a case where a hydroxy group, an ether group, an ester group, a cyano group, an amido group or a sulfonamido group is present in the substituent is preferred because the aggregation property and fastness of the dye are improved.

$Y_{11}$ to $Y_{18}$ each independently represent preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxy group or a sulfo group, more preferably a hydrogen atom, a halogen atom, a cyano group, a carboxy group or a sulfo group, and most preferably a hydrogen atom.

$a_{11}$ to $a_{14}$ each independently represent preferably 1 or 2, and it is more preferred that all of them represent 1.

$M_1$ represents a hydrogen atom, a metal element or an oxide, hydroxide or halide thereof, preferably Cu, Ni, Zn or Al, and most preferably Cu.

In the case where the phthalocyanine dye represented by formula (II) is water-soluble, the dye preferably contains an ionic hydrophilic group. Examples of the ionic hydrophilic group include a sulfo group, a carboxyl group, a phosphono group and a quaternary ammonium group. Among the ionic hydrophilic groups, a carboxy group, a phosphono group and a sulfo group are preferred, and a carboxy group and a sulfo group are particularly preferred. The carboxy group, phosphono group and sulfo group each may be in the state of salt and examples of the counter ion for forming the salt include an ammonium ion, an alkali metal ion (e.g., a lithium ion, a sodium ion or a potassium ion) and an organic cation (e.g., a tetramethylammonium ion, a tetramethylguanidium ion or a tetramethylphosphonium). Among the counter ions, an alkali metal salt is preferred and a lithium salt is more preferred because the solubility of dye and the stability of ink are improved.

As for the number of ionic hydrophilic groups, the phthalocyanine dye preferably contains at least two ionic hydrophilic groups, particularly preferably at least two sulfo groups and/or carboxy groups, per molecule.

With respect to preferred combination of substituents in the compound represented by formula (II), a compound wherein at least one of various substituents is the above-described preferred group is preferred, a compound wherein a larger number of various substituents are the above-described preferred groups is more preferred, and a compound wherein all substituents are the above-described preferred groups is most preferred.

As for the chemical structure of the phthalocyanine dye according to the invention, it is preferred that at least one electron-withdrawing group, for example, a sulfinyl group, a sulfonyl group or a sulfamoyl group is introduced into respective four benzene rings of the phthalocyanine dye so that the sum total of Hammett's substituent constant op values of the substituents in the entire phthalocyanine skeleton becomes 1.6 or more.

The Hammett's substituent constant op value is described below. The Hammett's rule is an empirical rule advocated by L. P. Hammett in 1935 in order to quantitatively discuss an effect of substituent on a reaction or equilibrium of benzene derivative and its propriety is widely admitted at present. The substituent constant determined by the Hamett's rule includes a σp value and a σm value and these values can be found in a large number of ordinary publications and they are described in detail, for example, in J. A. Dean (compiler), *Lanqe's Handbook of Chemistry*, 12th ed., McGraw-Hill (1979) and *Kagaku no Ryoiki* (*Chemistry Region*), extra number, No. 122, pp. 96–103, Nankodo Co., Ltd. (1979).

In general, in view of the synthesis method, the phthalocyanine derivative represented by formula (I) comprises inevitably a mixture of analogues different in the site where the substituents Xn (n is 1 to 4) and Ym (m is 1 to 4) are introduced and in the number of the substituents introduced. Therefore, the mixtures of analogues are statistically averaged and represented by a formula in many cases. According to the invention, it has been found that when the mixtures of analogues are classified into three types described below, a specific mixture is particularly preferred. Specifically, the mixtures of analogues of phthalocyanine dye represented by formulae (I) or (II) are defined by classifying them into three types described below based on the substitution site.

(1) β-Position Substitution Type:

A phthalocyanine dye having specific substituents at the 2- and/or 3-position, the 6- and/or 7-position, the 10- and/or 11-position and the 14- and/or 15-position.

(2) α-Position Substitution Type:

A phthalocyanine dye having specific substituents at the 1- and/or 4-position, the 5- and/or 8-position, the 9- and/or 12-position and the 13- and/or 16-position.

(3) α, β-Position Mixed Substitution Type:

A phthalocyanine dye having specific substitutions at the 1- to 16-positions without any regularity.

In the specification, phthalocyanine dye derivatives different in the structure (particularly, in the substitution site) are described using the β-position substitution type, α-position substitution type and α,β-position mixed substitution type.

The phthalocyanine derivative for use in the invention can be synthesized by combining the methods described or cited, for example, in Shirai and Kobayashi, *Phthalocyanine—Kagaku to Kino—(Phthalocyanine—Chemistry and Function—)*, pp. 1–62, IPC, and C. C. Leznoff and A. B. P. Lever, *Phthalocyanines—Properties and Applications*, pp. 1–54, VCH, or methods analogous thereto.

The phthalocyanine compound represented by formula (I) according to the invention can be synthesized, for example, through sulfonation, sulfonyl chloridation or amidation of an unsubstituted phthalocyanine compound as described, for example, in WO 00/17275, WO 00/08103, WO 00/08101, WO 98/41853 and JP-A-10-36471. In such a case, sulfonation may take place at any site of the phthalocyanine nucleus and the number of sites sulfonated is difficult to control. Accordingly, when sulfo groups are introduced under such reaction conditions, the cite and number of sulfo groups introduced into the product cannot be specified and a mixture of compounds different in the number of substituents and the substitution site is inevitably formed. When the compound according to the invention is synthesized using such a product, the compound obtained is an α, β-position mixed substitution type mixture containing several kinds of compounds different in the number of substituents and the substitution site because the number of sulfamoyl groups substituted on the heterocyclic ring and their substitution sites cannot be specified.

As described above, for example, when many electron-withdrawing groups, for example, sulfamoyl groups are introduced into the phthalocyanine nucleus, the oxidation potential of the phthalocyanine dye becomes more positive and thus the ozone resistance thereof increases. However, according to the above-described synthesis method, the interfusion of a phthalocyanine dye in which the number of electron-withdrawing groups introduced is small, that is, the oxidation potential is more negative is inevitable. Therefore, in order to improve the ozone resistance, it is desired to use a synthesis method wherein the production of a compound having a more negative oxidation potential is restrained.

The phthalocyanine compound represented by formula (II) according to the invention can be synthesized, for example, by reacting a phthalonitrile derivative (represented by Formula P) shown below and/or a diiminoisoindoline derivative (represented by Formula Q) shown below with a metal derivative represented by formula (III), or can be derived from a tetrasulfophthalocyanine compound obtained by reacting a 4-sulfophthalonitrile derivative (represented by Formula R) shown below with a metal derivative represented by formula (III). Two phthalocyanine compounds at right sides of the reaction schemes shown below indicate representative examples of the phthalocyanine compound represented by formula (II).

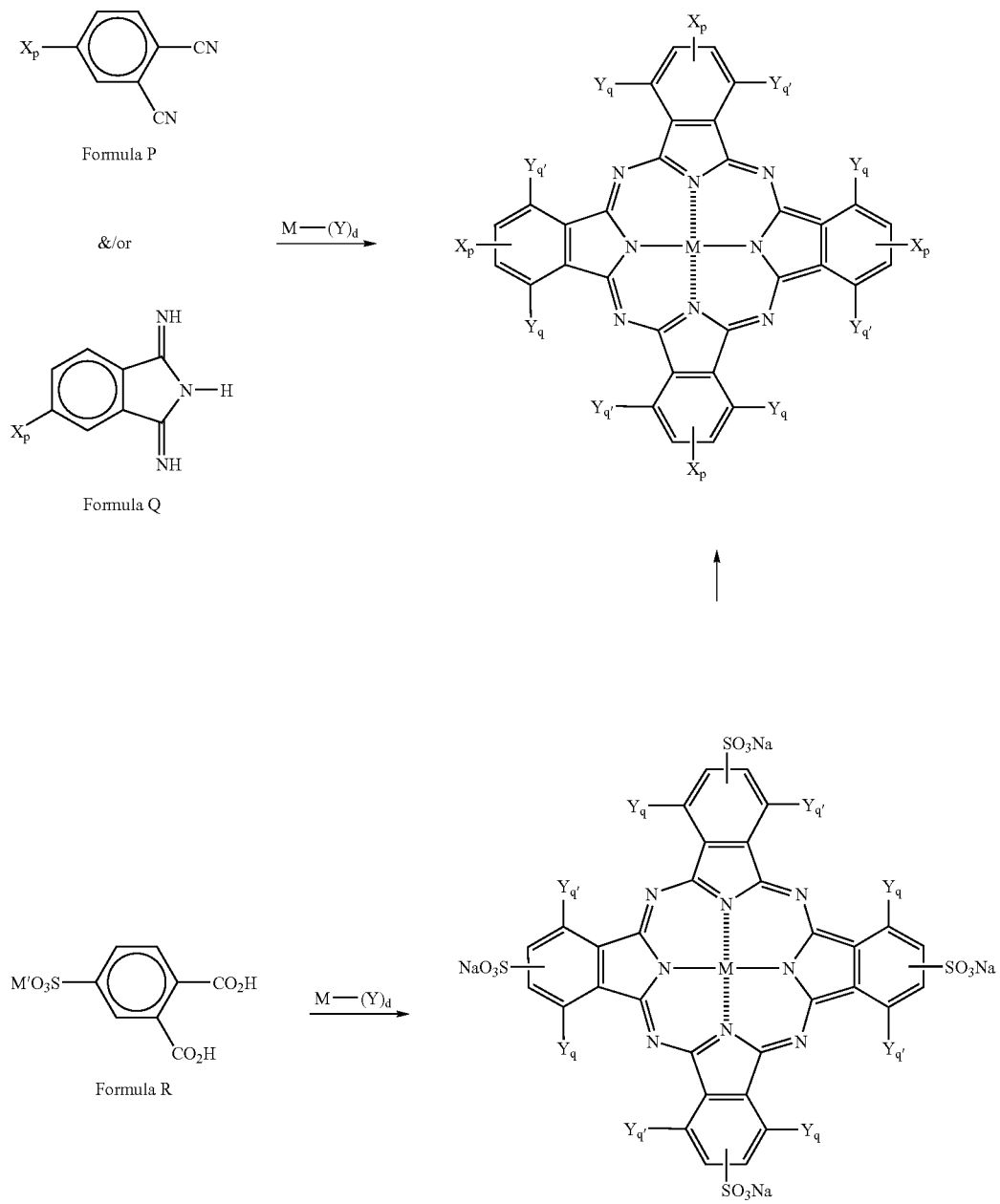

In the formulae above, $X_p$ correspond to $X_{11}$, $X_{12}$, $X_{13}$ or $X_{14}$ in formula (II) and $Y_q$ and $Y_{q'}$ each correspond to $Y_{11}$, $Y_{12}$, $Y_{13}$, $Y_{14}$, $Y_{15}$, $Y_{16}$, $Y_{17}$ or $Y_{18}$ in formula (II). In Formula R, M' represents a cation.

Examples of the cation represented by M' include an alkali metal ion, for example, Li, Na or K and an organic cation, for example, a triethylammonium ion or a pyridinium ion.

$$M\text{-}(Y)_d \qquad (III)$$

wherein M has the same meaning as defined for M in formulae (I) or (II); Y represents a monovalent or divalent ligand, for example, a halogen atom, an acetate anion, acetylacetonate or an oxygen atom;, and d represents an integer of from 1 to 4.

Specifically, according to the above-described synthesis method, a specific number of the desired substituents can be introduced. Particularly, in the case of introducing a large number of electron-withdrawing groups so as to render the oxidation potential more positive as in the invention, the above-described synthesis method is very excellent as compared with the conventional method for synthesizing the phthalocyanine compound of formula (I).

The thus-obtained phthalocyanine compound represented by formulae (II) is ordinarily a mixture of compounds represented by formulae (a)-1 to (a)-4 shown below, which are isomers with respect to the substitution site of each $X_p$, that is, the β-position substitution type.

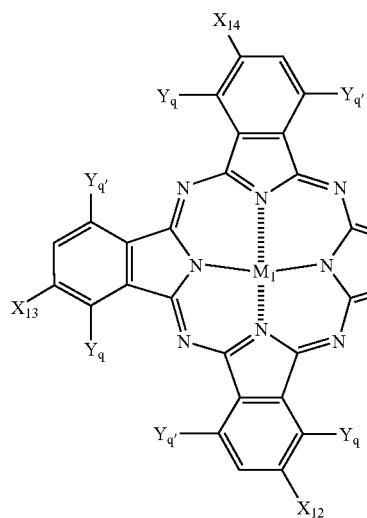

(a)-1

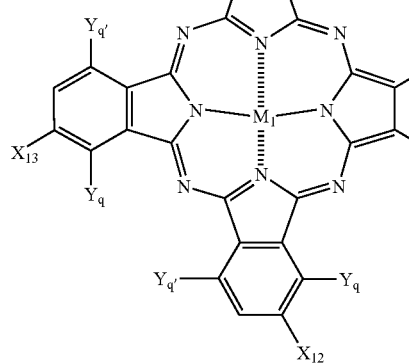

(a)-2

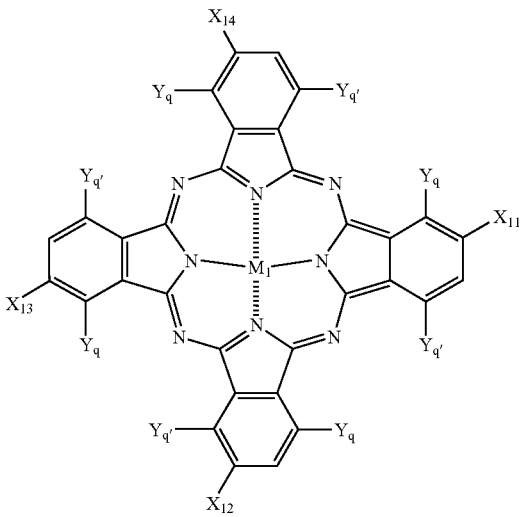

(a)-3

-continued

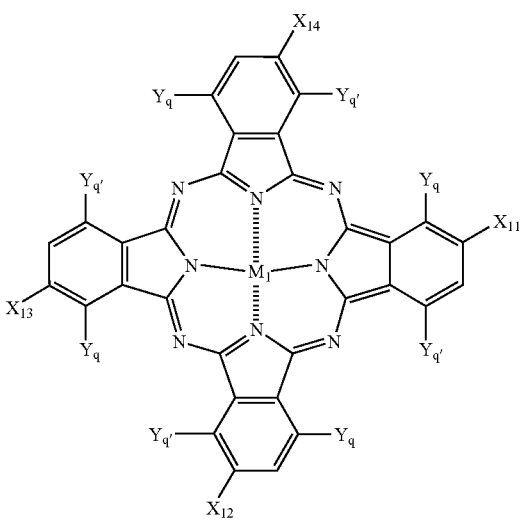

(a)-4

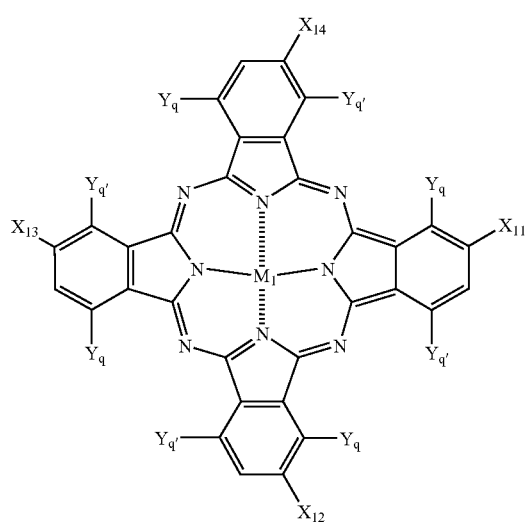

In the synthesis method described above, when all of $X_p$s are the same, a β-position substitution type phthalocyanine dye wherein $X_{11}$, $X_{12}$, $X_{13}$ and $X_{14}$ are completely the same substituents can be obtained. On the other hand, when $X_p$s are different, a dye having substituents of the same kind but partially different from each other or a dye having substituents different from each other can be synthesized. Among the dyes of formula (II), the dyes having electron-withdrawing substituents different from each other are especially preferred because the solubility and aggregation property of dye and the aging stability of ink can be controlled.

According to the invention, it has been found very important for the improvement in fastness that in any substitution type, the oxidation potential is more positive than 1.0 V (vs SCE). The large effect thereof cannot be expected at all from the above-described known techniques. Furthermore, although the reason is not entirely clear, there is a tendency that the β-position substitution type is apparently more excellent in the color hue, light fastness, ozone gas resistance and the like than the α,β-position mixed substitution type.

Specific examples (Compounds I-1 to I-12 and 101 to 190) of the phthalocyanine dyes represented by formulae (I) and (II) are set forth below, however, the phthalocyanine dyes for use in the invention should not be construed as being limited thereto.

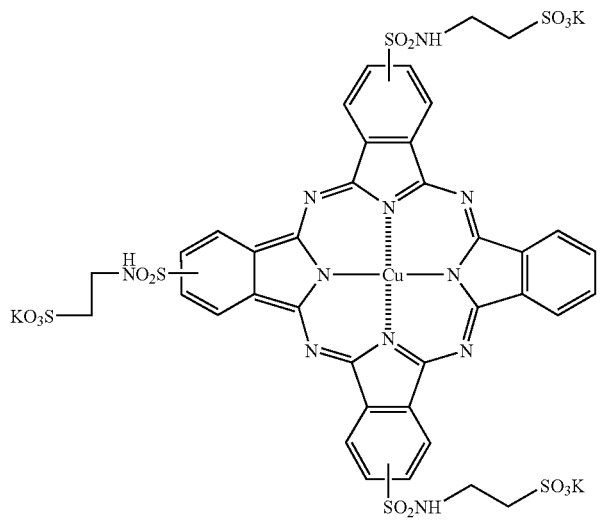

(I-1)

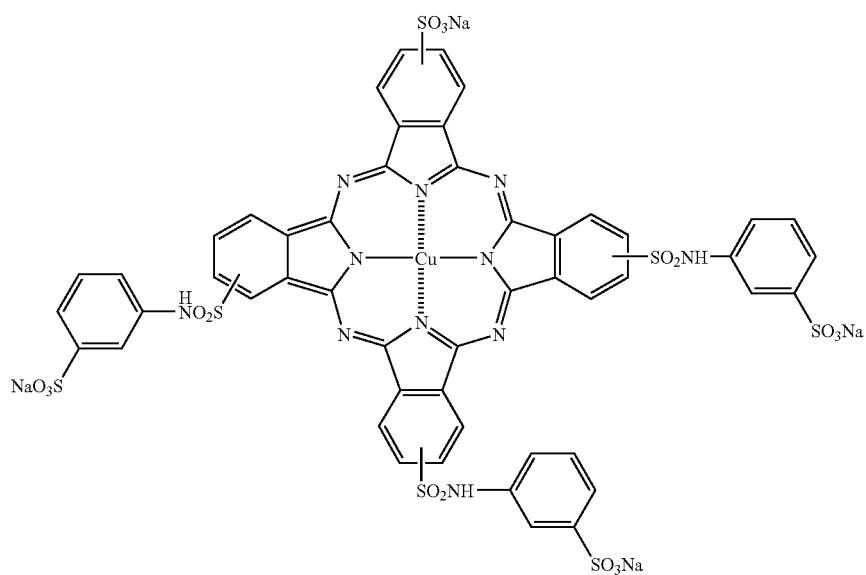

(I-2)

(I-3)
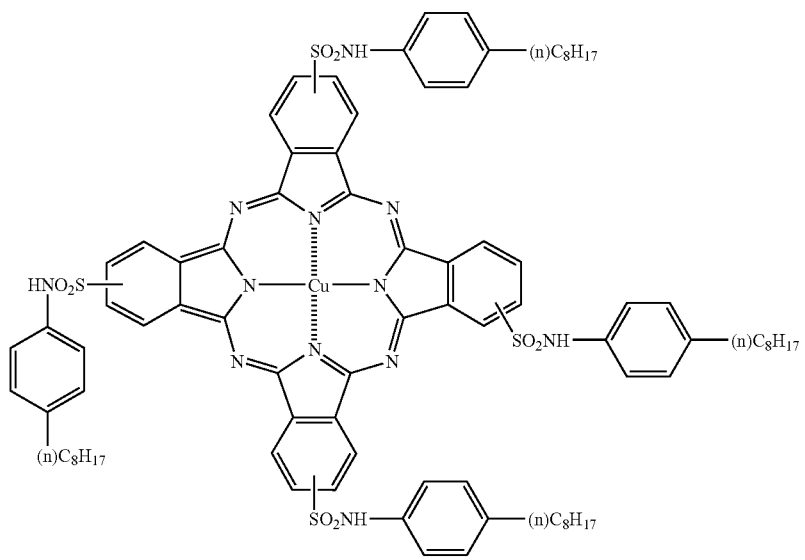
(I-4)
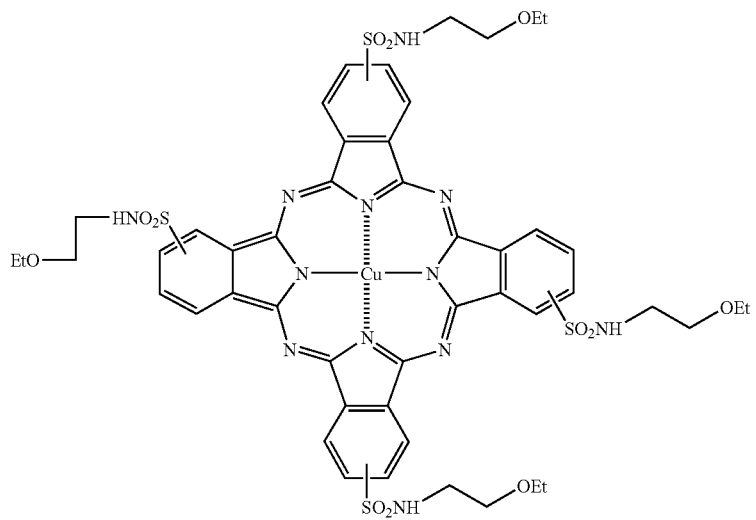

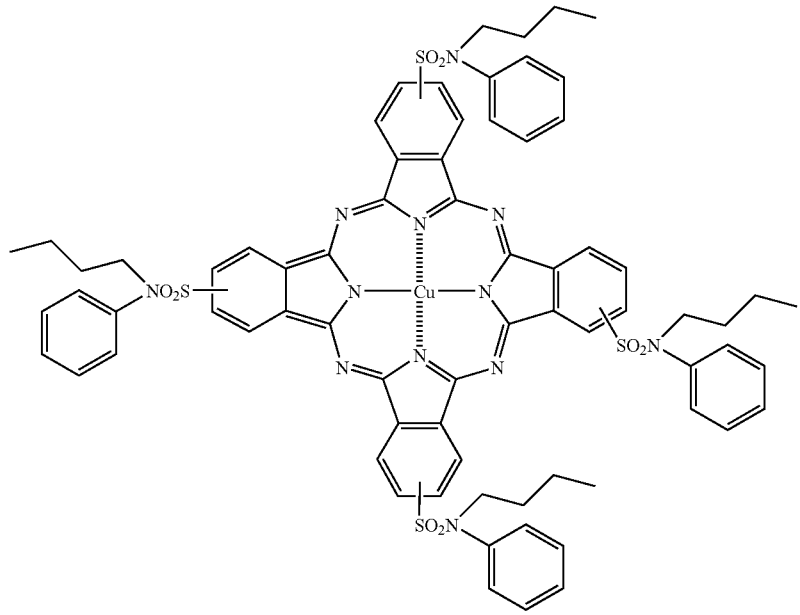
(I-5)
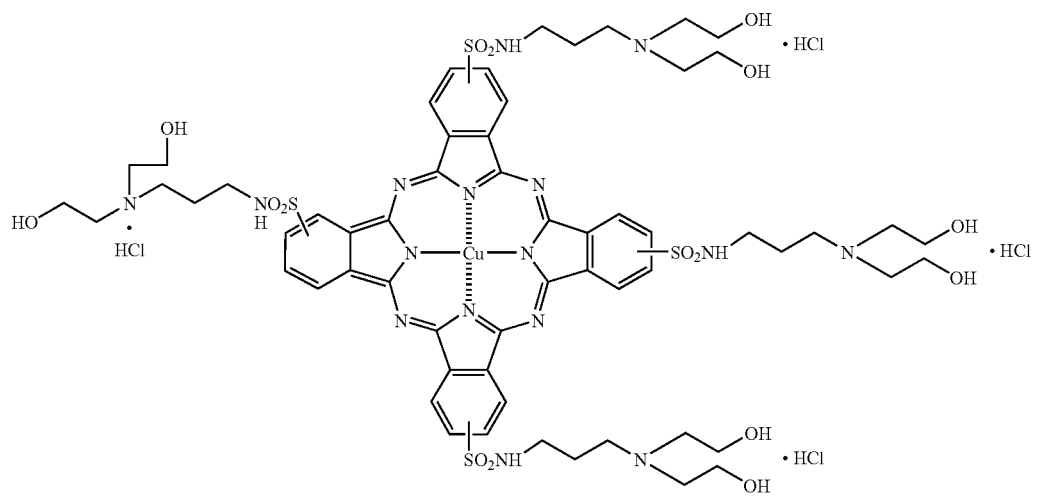
(I-6)

-continued
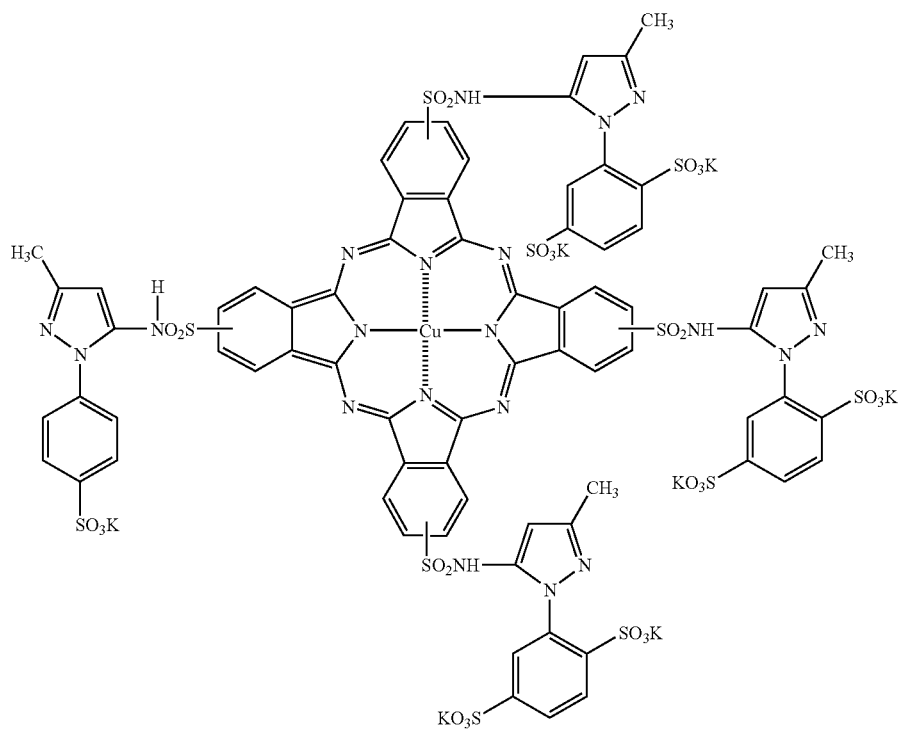
(I-7)
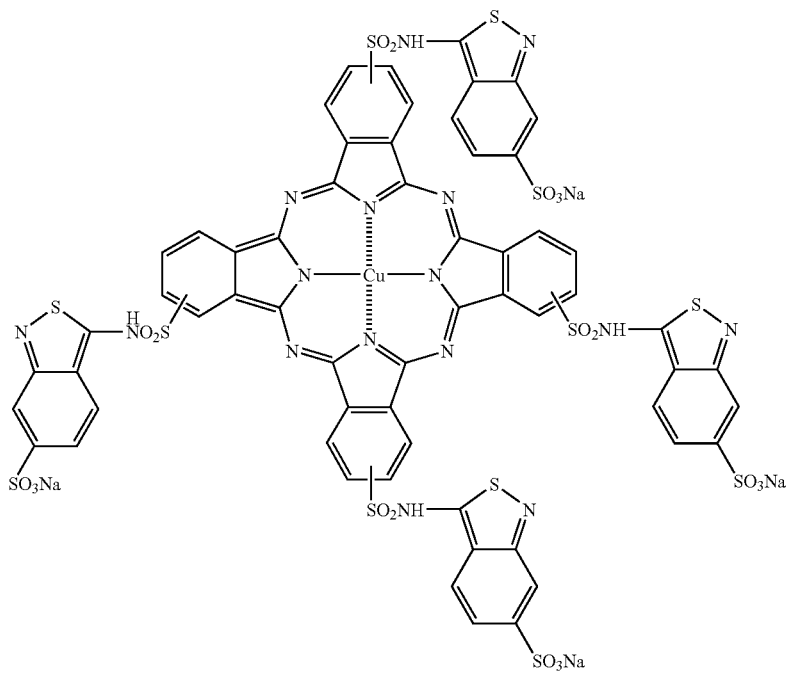
(I-8)

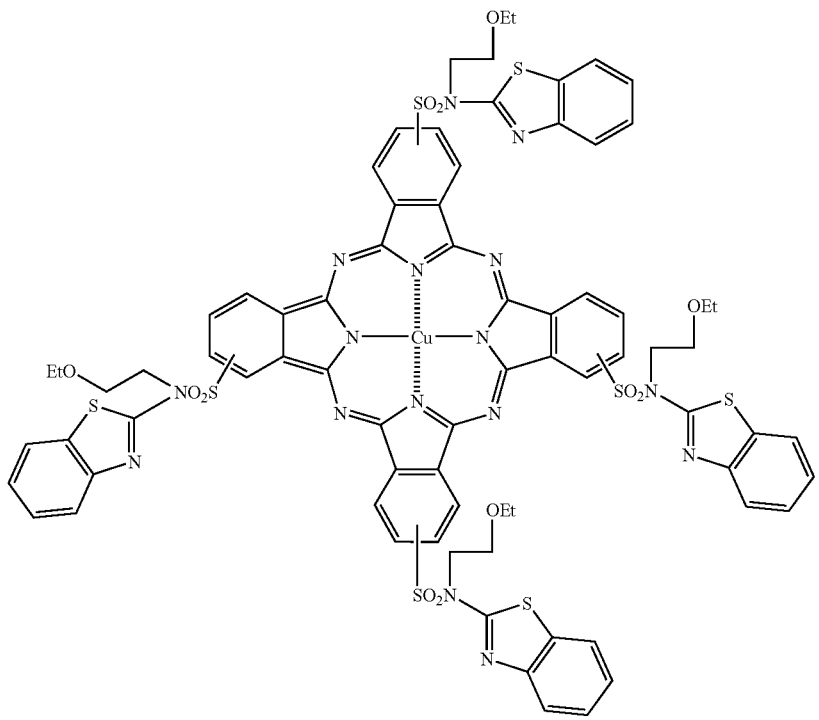
(I-9)
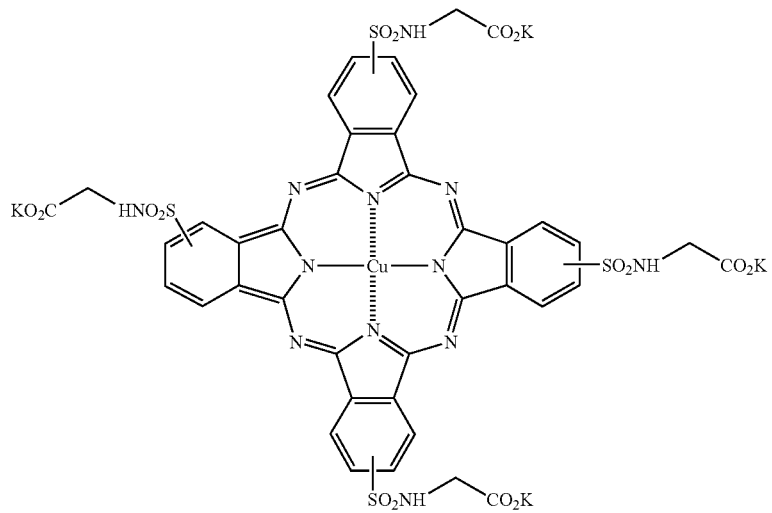
(I-10)

-continued
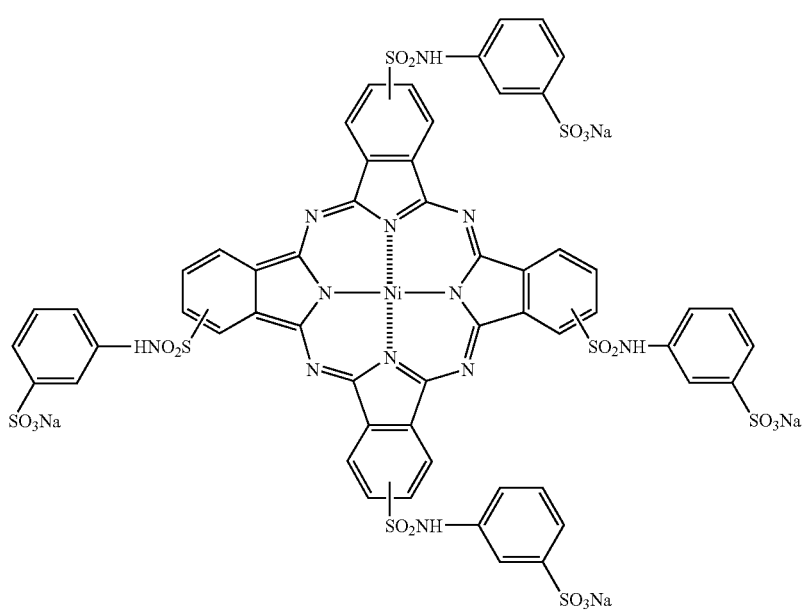
(I-11)
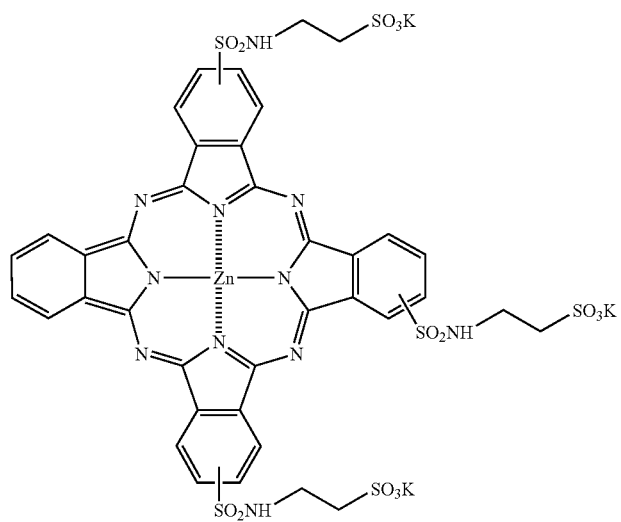
(I-12)
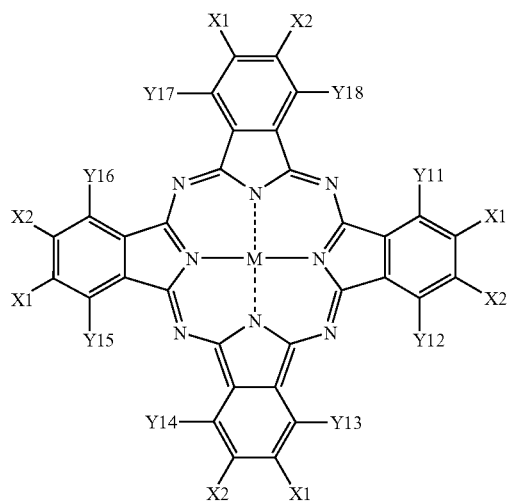

In the following tables, in the specific examples such as pairs (X1, X2), (Y11, Y12), (Y13, Y14), (Y15, Y16) and (Y17, Y18), the positions of each of members of the given pair are exchangeable with each other. For example, the position of X1 can be exchanged with the position of X2.

| No. | M  | X1 | X2 | Y11, Y12 | Y13, Y14 | Y15, Y16 | Y17, Y18 |
|-----|----|----|----|----------|----------|----------|----------|
| 101 | Cu | —SO$_2$—NH—CH$_2$—CH$_2$—SO$_3$Li | —H | —H, —H | —H, —H | —H, —H | —H, —H |
| 102 | Cu | —SO$_2$—NH—CH$_2$—CH(OH)—CO—NH—CH$_2$CH$_2$—SO$_3$Na | —H | —Cl, —H | —Cl, —H | —Cl, —H | —Cl, —H |
| 103 | Cu | —SO$_2$—NH—CH$_2$—CH$_2$—CH$_2$—SO$_2$NH—CH$_2$CH(OH)—SO$_3$Li | —H | —H, —H | —H, —H | —H, —H | —H, —H |
| 104 | Cu | —SO$_2$—NH—C$_6$H$_4$—SO$_2$NH—CH$_2$CH$_2$—SO$_3$Li | —H | —H, —H | —H, —H | —H, —H | —H, —H |
| 105 | Ni | —SO$_2$—NH—CH$_2$—CH$_2$—CO—NH—CH(CH$_2$—COONa)—COONa | —H | —Cl, —H | —Cl, —H | —Cl, —H | —Cl, —H |
| 106 | Cu | —SO$_2$—NH—CH$_2$—CH$_2$—SO$_2$—NH—CH$_2$—COONa | —CN | —H, —H | —H, —H | —H, —H | —H, —H |
| 107 | Cu | —SO$_2$—CH$_2$—CH$_2$—CH$_2$—SO$_2$—NH—CH(CH$_2$—OH)—COOLi | —H | —H, —H | —H, —H | —H, —H | —H, —H |
| 108 | Cu | —SO$_2$—CH$_2$—CH$_2$—CH$_2$—SO$_3$Li | —H | —H, —H | —H, —H | —H, —H | —H, —H |
| 109 | Cu | —SO$_2$—CH$_2$—CH$_2$—CH$_2$—SO$_3$K | —H | —H, —H | —H, —H | —H, —H | —H, —H |
| 110 | Cu | —SO$_2$—(CH$_2$)$_5$—CO$_2$K | —H | —H, —H | —H, —H | —H, —H | —H, —H |
| 111 | Cu | —SO$_2$—NH—CH$_2$—CH$_2$—CH$_2$—SO$_2$—NH—CH$_2$CH(OH)—CH$_2$—SO$_3$Li | —H | —H, —H | —H, —H | —H, —H | —H, —H |
| 112 | Cu | —SO$_2$—NH—CH$_2$—CH$_2$—CH$_2$—SO$_2$NH—CH$_2$—CH(OH)—CH$_3$ | —SO$_3$Li | —H, —H | —H, —H | —H, —H | —H, —H |
| 113 | Cu | —SO$_2$—CH$_2$—CH(OH)—CH$_2$SO$_3$K | —H | —H, —H | —H, —H | —H, —H | —H, —H |
| 114 | Cu | —SO$_2$—CH$_2$—CH(OH)—CH$_3$ | —SO$_3$Li | —H, —H | —H, —H | —H, —H | —H, —H |
| 115 | Cu | —SO$_2$NH(CH$_2$)$_3$$^{\oplus}$N(CH$_3$)(CH$_2$CH$_2$OH)$_2$—CH$_2$—C$_6$H$_4$—SO$_3$$^{\ominus}$ | —H | —H, —H | —H, —H | —H, —H | —H, —H |
| 116 | Cu | —CO—NH—CH$_2$—CH(OH)—CH$_2$SO$_3$K | —H | —H, —H | —H, —H | —H, —H | —H, —H |
| 117 | Cu | —CO—NH—CH(COOLi)—CH$_2$CH$_2$SO$_3$Li | —H | —H, —H | —H, —H | —H, —H | —H, —H |

-continued

| No. | M | X1 | X2 | Y11, Y12 | Y13, Y14 | Y15, Y16 | Y17, Y18 |
|---|---|---|---|---|---|---|---|
| 118 | Cu | —SO₂CH₂CH₂CH(CH₃)SO₃Li | —H | —H, —H | —H, —H | —H, —H | —H, —H |
| 119 | Cu | —SO₂—CH₂—CH(OH)—CH₂—SO₃Na | —H | —H, —H | —H, —H | —H, —H | —H, —H |
| 120 | Cu | —SO₂—CH₂—CH₂—CH(CH₃)—COOLi | —H | —H, —H | —H, —H | —H, —H | —H, —H |
| 121 | Cu | —SO₂(CH₂)₃SO₂NHCH₂—CH(OH)—CH₂—SO₃Li | —H | —H, —H | —H, —H | —H, —H | —H, —H |
| 122 | Cu | —CO₂CH₂CH₂CH₂SO₂—NH—CH₂—CH(OH)—CH₂—SO₃Li | —H | —H, —H | —H, —H | —H, —H | —H, —H |
| 123 | Cu | —SO₂NH—C₈H₁₇(t) | —H | —H, —H | —H, —H | —H, —H | —H, —H |
| 124 | Cu | —SO₂—NH—CH₂—CH(CH₂CH₃)—CH₂CHCH₂—CH₃ | —H | —H, —H | —H, —H | —H, —H | —H, —H |
| 125 | Cu | —SO₂CH₂CH₂CH₂SO₂—NH—CH₂—CH(CH₃)—CH₂—CH₃ | —H | —H, —H | —H, —H | —H, —H | —H, —H |
| 126 | Cu | —SO₂—CH₂—CH₂—CH₂—CO₂—CH(CH₃)—CH₂—O—CH₃ | —H | —H, —H | —H, —H | —H, —H | —H, —H |
| 127 | Cu | —SO₂CH₂CH₂CH₂SO₂NHCH₂CH₂CH₂O—CH(CH₃)₂ | —H | —H, —H | —H, —H | —H, —H | —H, —H |
| 128 | Zn | —SO₂—CH₂—CH(OCH₃)—CH₂—O—CH₂— | —CN | —H, —H | —H, —H | —H, —H | —H, —H |
| 129 | Cu | —CO—NH—CH₂—CH(CH₂CH₃)—CH₂—CH₂—CH₂CH₃ | —H | —Cl, —H | —Cl, —H | —Cl, —H | —Cl, —H |
| 130 | Cu | —CO₂—CH(CH₃)—CH₂—O—C₄H₉(t) | —H | —H, —H | —H, —H | —H, —H | —H, —H |
| 131 | Cu | —SO₂—CH₂—CH₂—CH(CH₃)—SO₂—NH—C₆H₃(SO₃Li)₂ | —H | —H, —H | —H, —H | —H, —H | —H, —H |
| 132 | Cu | —SO₂NH—C₆H₃(CO₂C₆H₁₃(n))₂ | —H | —H, —H | —H, —H | —H, —H | —H, —H |

-continued

| No. | M | X1 | X2 | Y11, Y12 | Y13, Y14 | Y15, Y16 | Y17, Y18 |
|---|---|---|---|---|---|---|---|
| 133 | Cu | —SO₂NH—(C₆H₃)(OCH₂CH₂OCH₃)(SO₂NHCH₂CH(C₂H₅)(C₄H₉)) | —H | —H, —H | —H, —H | —H, —H | —H, —H |
| 134 | Cu | —SO₂NH—C₆H₄—SO₂—NH—CH₂—CH(CH₂CH₃)—CH₂CH₂—CH₂—CH₃ | —H | —H, —H | —H, —H | —H, —H | —H, —H |
| 135 | Cu | —SO₂—(C₆H₄)—CO₂Na (meta) | —H | —H, —H | —H, —H | —H, —H | —H, —H |
| 136 | Cu | —SO₂N(C₄H₉(n))(C₆H₅) | —H | —H, —H | —H, —H | —H, —H | —H, —H |
| 137 | Cu | —SO₂—(2-benzothiazolyl)-6-SO₃Li | —H | —H, —H | —H, —H | —H, —H | —H, —H |
| 138 | Cu | —SO₂NH—(5-pyrazolyl, 3-CH₃, 1-(2,5-di(LiO₃S)phenyl)) | —H | —H, —H | —H, —H | —H, —H | —H, —H |
| 139 | Cu | —SO₂(CH₂)₃—NH—C(=O)—(C₆H₃)(CO₂Li)(CO₂Li) | —Cl | —H, —H | —H, —H | —H, —H | —H, —H |
| 140 | Cu | —CO₂—CH₂CH₂CH₂—NH—(triazine)—(NH—CH₂—CH₂—CH(CH₃)—SO₃Li)(NH—CH₂—CH₂—CH(CH₃)—SO₃Li) | —H | —H, —H | —H, —H | —H, —H | —H, —H |
| 141 | Cu | —SO₂NH—CH(COONa)—CH₂—CO—N(CH₂CH₂OH)₂ | —H | —H, —H | —H, —H | —H, —H | —H, —H |

-continued

| No. | M | X1 | X2 | Y11, Y12 | Y13, Y14 | Y15, Y16 | Y17, Y18 |
|---|---|---|---|---|---|---|---|
| 142 | Cu | —SO$_2$NH—(3-phenyl)—NHC(=O)—(3-phenyl)—SO$_3$Li | —H | —H, —H | —H, —H | —H, —H | —H, —H |
| 143 | Cu | —CO—NH—CH$_2$—CH(OH)—CO—NH—CH(COOK)—CH$_2$CH$_2$—SO$_3$K | —H | —H, —H | —H, —H | —H, —H | —H, —H |
| 144 | Cu | —SO$_2$—CH$_2$CH$_2$CH$_2$—NH—CO—(phenyl)—CO—NH—CH(COOLi)—CH$_2$—COOLi | —H | —H, —H | —H, —H | —H, —H | —H, —H |
| 145 | Cu | —SO$_2$CH$_2$CH$_2$OCH$_2$CH$_2$OCH$_2$CH$_2$SO$_3$Li | —H | —H, —H | —H, —H | —H, —H | —H, —H |

$$M\text{-}Pc(X_{p1})_m(X_{p2})_n \qquad 25$$

In the following tables, the introduction positions of the substituents ($X_{p1}$) and ($X_{p2}$) in each compound are exchangeable with each other in the β-position substitution type phthalocyanine dye.

| No. | M | Xp$_1$ | m |
|---|---|---|---|
| 146 | Cu | —SO$_2$—NH—CH$_2$—CH(CH$_3$)—SO$_3$Li | 3 |
| 147 | Cu | —SO$_2$—NH—CH$_2$—CH$_2$SO$_3$Li | 3 |
| 148 | Cu | —SO$_2$—NH—CH$_2$—CH(CH$_3$)—SO$_3$Li | 3 |
| 149 | Cu | —SO$_2$—NH—CH$_2$—CH(CH$_3$)—SO$_3$Li | 2 |
| 150 | Cu | —SO$_2$—NH—CH$_2$—CH$_2$—SO$_2$—NH—CH$_2$CH$_2$—COONa | 3 |
| 151 | Cu | —SO$_2$—NH—(phenyl)—SO$_2$NH—CH$_2$—CH(OH)—SO$_3$Li | 3 |
| 152 | Cu | —SO$_2$—CH$_2$—CH$_2$—CH(CH$_3$)—SO$_3$Li | 2.5 |
| 153 | Cu | —SO$_2$—CH$_2$—CH$_2$—CH(CH$_3$)—SO$_3$Na | 2 |
| 154 | Cu | —SO$_2$—CH$_2$—CH$_2$—CH$_2$—SO$_3$Li | 3 |
| 155 | Cu | —SO$_2$—CH$_2$—CH$_2$—CH$_2$—COOK | 2 |
| 156 | Cu | —SO$_2$—CH$_2$—CH$_2$—CH$_2$—SO$_3$Li | 3 |
| 157 | Cu | —SO$_2$—CH$_2$—CH$_2$—O—CH$_2$—CH$_2$—SO$_3$Li | 2 |
| 158 | Cu | —SO$_2$—CH$_2$—CH(OH)—CH$_2$SO$_3$Li | 3 |

-continued

| # | M | Substituent | n |
|---|---|---|---|
| 159 | Cu | —SO$_2$NHCH$_2$CH$_2$—SO$_3$Li | 3 |
| 160 | Cu | —SO$_2$—CH$_2$—CH$_2$—O—CH$_2$—CH$_2$—O—CH$_2$—CH$_2$—SO$_3$Na | 3 |
| 161 | Cu | —SO$_2$CH$_2$CH$_2$CH$_2$SO$_3$Li | 3 |
| 162 | Cu | —SO$_2$CH$_2$CH$_2$CH$_2$SO$_3$Li | 2 |
| 163 | Cu | —SO$_2$CH$_2$CH$_2$CH$_2$SO$_3$K | 3 |
| 164 | Cu | —SO$_2$CH$_2$CH$_2$CH$_2$SO$_3$Li | 2 |
| 165 | Cu | —CO—NH—CH$_2$—CH$_2$—SO$_3$K | 3 |
| 166 | Cu | —CO—NH—CH$_2$—CH$_2$—SO$_2$—NH—CH$_2$—CH$_2$—COONa | 3 |
| 167 | Cu | —SO$_2$(CH$_2$)$_3$SO$_2$NHCH$_2$—CH(OH)—CH$_2$CO$_2$Li | 2.5 |
| 168 | Cu | —CO$_2$—CH$_2$—CH$_2$—CH(CH$_3$)—SO$_3$Na | 2 |
| 169 | Cu | —CO$_2$—CH$_2$—CH$_2$—CH$_2$—SO$_3$Li | 3 |
| 170 | Cu | —CO$_2$—CH$_2$—CH$_2$—CH$_2$COOK | 2 |
| 171 | Cu | —CO$_2$—CH$_2$—CH$_2$—O—CH$_2$—CH$_2$—O—CH$_2$—CH$_2$—SO$_3$Na | 3 |
| 172 | Cu | —SO$_2$CH$_2$CH$_2$OCH$_2$CH$_2$O—CH$_2$CH$_2$SO$_3$K | 2 |
| 173 | Cu | —SO$_2$(CH$_2$)$_3$SO$_2$NHCH$_2$CH(OH)CH$_2$OH | 2 |
| 174 | Cu | —SO$_2$(CH$_2$)$_3$SO$_2$NHCH$_2$—CH(OH)—CH$_2$SO$_3$K | 3 |
| 175 | Cu | —SO$_2$(CH$_2$)$_3$SO$_2$NH(CH$_2$)$_2$N(CH$_2$CH$_2$OH)$_2$ | 2 |
| 176 | Cu | —SO$_2$—CH$_2$—CH$_2$—CH$_2$—SO$_2$—NH—CH$_2$—CH(OH)—CH$_3$ | 3 |
| 177 | Cu | —SO$_2$—CH$_2$—CH$_2$—O—CH$_2$—CH$_2$—O—CH$_3$ | 2 |
| 178 | Cu | —SO$_2$—CH$_2$—CH$_2$—O—CH$_2$—CH$_2$—O—CH$_2$—CH$_2$—OH | 3 |
| 179 | Cu | —SO$_2$—CH$_2$—CH(CH$_2$CH$_3$)—CH$_2$CH$_2$—CH$_2$CH$_3$ | 2 |
| 180 | Cu | —SO$_2$—CH$_2$—CH$_2$—CH$_2$—SO$_2$—NH—CH$_2$—CH(OCH$_3$)—CH$_3$ | 3 |
| 181 | Cu | —SO$_2$—CH$_2$—CH$_2$—CH$_2$—CO$_2$—NH—CH(CH$_3$)—CH$_2$—CH$_3$ | 3 |
| 182 | Cu | —SO$_2$—CH$_2$—CH$_2$—CH$_2$—SO$_2$NH—CH$_2$—CH(OH)—CH$_3$ | 2.5 |
| 183 | Cu | —SO$_2$—CH$_2$—CH$_2$—CH$_2$—CO$_2$—NH—CH(CH$_3$)—CH$_2$—CH$_3$ | 2 |
| 184 | Cu | —SO$_2$—CH$_2$—CH$_2$—CH$_2$—SO$_2$—NH—CH$_2$—CH(OH)—CH$_3$ | 3 |
| 185 | Cu | —SO$_2$—CH$_2$—CH$_2$—CH$_2$—SO$_2$—NH—CH$_2$—CH(OH)—CH$_3$ | 3 |
| 186 | Cu | —SO$_2$—CH$_2$—CH$_2$—CH$_2$—CO$_2$—NH—CH(CH$_3$)—CH$_2$—CH$_3$ | 3 |
| 187 | Cu | —SO$_2$—CH$_2$—CH$_2$—CH$_2$—SO$_2$—NH—CH—(CH$_2$)$_2$ | 3 |

-continued

| No. | | n |
|---|---|---|
| 188 | Cu —CO₂—CH₂—CH₂—CH₂—CO₂—NH—CH(CH₃)—CH₂—CH₃ | 3 |
| 189 | Cu —CO—NH—CH₂—CH₂—SO₂—NH—CH(CH₃)₂ | 3 |
| 190 | Cu —CO—NH—CH₂—CH(CH₂CH₃)—CH₂—CH₂—CH₂CH₃ | 3 |

| No. | Xp₂ | n |
|---|---|---|
| 146 | —SO₂—NH—CH₂—CH(OH)—CH₃ | 1 |
| 147 | —SO₂—NH—CH₂—CH₂—CH₂—SO₂—NH—CH₂—CH(OH)—CH₃ | 1 |
| 148 | —SO₂NH—CH₂—CH₂—CH₂—SO₂—NH—CH₂—CH₂—O—CH₂—CH₂—OH | 1 |
| 149 | —SO₂—NH—CH₂—CH₂—CH₂—CO—N(—CH₂—CH₂—OH)₂ | 2 |
| 150 | —SO₂NH—CH(CH₃)—CH₂OH | 1 |
| 151 | —SO₂NH—CH₂—CH₂—O—CH₂—CH₂—OH | 1 |
| 152 | —SO₂—CH₂—CH₂—O—CH₂—CH₂—OH | 1.5 |
| 153 | —SO₂—CH₂—CH₂—CH₂—CO—N(—CH₂—CH₂—OH)₂ | 2 |
| 154 | —SO₂—CH₂—CH₂—CH₂—SO₂—NH—CH₂—CH(OH)—CH₃ | 1 |
| 155 | —SO₂—CH₂—CH₂—CH₂—SO₂—NH—CH₂—CH(OH)—CH₂—COOK | 2 |
| 156 | —SO₂—CH₂—CH(OH)—CH₂—SO₃Li | 1 |
| 157 | —SO₂—CH₂—CH₂—CH₂—CO₂—CH₂—CH₂—CH(OH)—CH₂—COOK | 2 |
| 158 | —SO₂—CH₂—C₆H₄—SO₂NH—CH₂—CH(OH)—CH₂—OH | 1 |
| 159 | —SO₂—CH₂—CH₂—CH₂—SO₂—NH—CH₂—CH(OH)—CH₃ | 1 |
| 160 | —SO₂—CH₂—CH₂—CH₂—CO—N(CH₂—CH₂—COONa)—CH₂—COONa | 1 |
| 161 | —SO₂CH₂CH₂CH₂SO₂NHCH₂—CH(OH)—CH₂SO₃Li | 1 |
| 162 | —SO₂CH₂CH₂OCH₂CH₂OCH₂CH₂OH | 2 |
| 163 | —SO₂CH₂CH₂CH₂SO₂NH—CH(CH₃)—CH₂—OH | 1 |
| 164 | —SO₂CH₂CH₂CH₂SO₂N(CH₂CH₂OH)₂ | 2 |
| 165 | —CO—NH—CH₂—CH₂—O—CH₂—CH₂—OH | 1 |

-continued

| | | |
|---|---|---|
| 166 | —CO—NH—CH$_2$—CH(OH)—CH$_3$ | 1 |
| 167 | —CO—NH—CH$_2$—CH$_2$—CH$_2$—CO—N—(CH$_2$—CH$_2$—OH)$_2$ | 1.5 |
| 168 | —CO—CH$_2$—CH$_2$—CH$_2$—CO—N—(CH$_2$—CH$_2$—OH)$_2$ | 2 |
| 169 | —CO$_2$—CH$_2$—CH$_2$—CH$_2$—SO$_2$—NH—CH$_2$—CH(OH)—CH$_3$ | 1 |
| 170 | —CO$_2$—CH$_2$—CH$_2$—CH$_2$—SO$_2$—NH—CH$_2$—CH(OH)—CH$_2$—COOK | 2 |
| 171 | —SO$_2$—CH$_2$—C$_6$H$_4$—SO$_2$NH—CH$_2$—CH(OH)—CH$_2$—OH | 1 |
| 172 | —CO$_2$—CH$_2$—CH$_2$—CH$_2$—CO$_2$—CH$_2$—CH(OH)—CH$_2$—COOK | 2 |
| 173 | —CO$_2$—CH$_2$—CH(OH)—CH$_2$—CH$_2$—SO$_3$Li | 2 |
| 174 | —CO$_2$—CH$_2$—CH$_2$—CH$_2$—SO$_2$—NH—CH$_2$—CH(OH)—CH$_3$ | 1 |
| 175 | —CO$_2$—CH$_2$—CH$_2$—CH$_2$—CO—N(CH$_2$—CH$_2$—COOLi)(CH$_2$—COOLi) | 2 |
| 176 | —SO$_2$—CH$_2$—CH$_2$—CH$_2$—SO$_2$—NH—CH$_2$—CH(CH$_2$CH$_3$)—CH$_2$CH$_2$—CH$_2$CH$_3$ | 1 |
| 177 | —SO$_2$—CH$_2$—CH$_2$—CH$_2$—SO$_2$—NH—CH$_2$—CH(OH)—CH$_3$ | 1 |
| 178 | —SO$_2$—CH$_2$—CH$_2$—CH$_2$—CO$_2$—CH$_2$—CH(CH$_2$CH$_3$)—CH$_2$CH$_2$—CH$_2$CH$_3$ | 1 |
| 179 | —SO$_2$—CH$_2$—CH$_2$—CH$_2$—SO$_2$—NH—CH$_2$—CH(O—CH$_3$)—CH$_3$ | 2 |
| 180 | —SO$_2$NH—CH$_2$—CH$_2$—SO$_2$NH—CH$_2$—CH$_2$—O—CH$_2$—CH$_2$—OH | 1 |
| 181 | —SO$_2$—CH$_2$—CH$_2$—CH$_2$—SO$_2$—NH—CH—(CH$_3$)$_2$ | 1 |
| 182 | —SO$_2$—CH$_2$—CH$_2$—CH$_2$—CO$_2$—NH—CH(CH$_3$)—CH$_2$—CH$_3$ | 1.5 |
| 183 | —SO$_2$—CH$_2$—CH$_2$—CH$_2$—SO$_2$—NH—(CH$_2$)$_2$—CH$_2$—O—CH$_2$CH$_2$—OH | 2 |
| 184 | —SO$_2$—CH$_2$—CH$_2$—O—CH$_2$—CH$_2$—O—CH$_3$ | 1 |
| 185 | —SO$_2$—CH$_2$—CH$_2$—O—CH$_2$—CH$_2$—O—CH$_2$—CH$_2$—O—CH$_3$ | 1 |
| 186 | —SO$_2$—CH$_2$—CH$_2$—O—CH$_2$—CH$_2$—O—CH$_2$—CH$_2$—OH | 1 |
| 187 | —CO$_2$—CH$_2$—CH(CH$_2$CH$_3$)—CH$_2$—CH$_2$—CH$_2$CH$_3$ | 1 |
| 188 | —CO$_2$—CH$_2$—CH$_2$—O—CH$_2$—CH$_2$—O—CH$_2$ | 1 |

-continued

| 189 | —SO$_2$—NH—CH$_2$—CH(CH$_2$CH$_3$)—CH$_2$—CH$_2$—CH$_2$—CH$_3$ | 1 |
| 190 | —CO—NH—CH$_2$—CH$_2$—O—CH$_2$—CH$_2$—O—CH$_2$ | 1 |

Regarding compound Nos. 146 to 190 in the tables above, the structure of the phthalocyanine compound represented by the formula of M-Pc($X_{p1}$)$_m$($X_{p2}$)$_n$ is shown below:

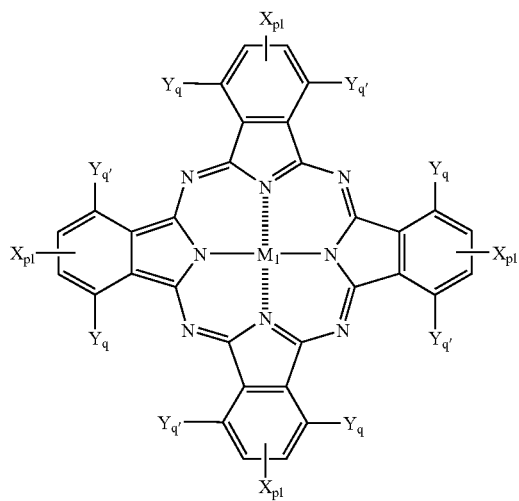

(wherein each $X_{p1}$ represents $X_{p1}$ or $X_{p2}$ as described in the tables above)

The phthalocyanine dye represented by formula (I) can be synthesized according to the methods described in the patents described above. Furthermore, the phthalocyanine dye represented by formula (II) can be synthesized according to the methods described in JP-A-2001-226275, JP-A-2001-96610, JP-A-2001-47013 and JP-A-2001-193638 in addition to the above-described synthesis methods. The starting materials, dye intermediates and synthesis routes are not limited to those described in the patents described above.

The inkjet recoding ink of the invention contains the dye in an amount of preferably from 0.2 to 20% by weight, more preferably from 0.5 to 15% by weight.

The inkjet recoding ink of the invention can be prepared by dissolving and/or dispersing the dye in an aqueous medium. The term "aqueous medium" as used herein means water or a mixture of water and a small amount of a water-miscible organic solvent, which may contain, if desired, an additive, for example, a wetting agent (preferably a surfactant as a dissolution aid or a dispersion aid), a stabilizer or an antiseptic. The ink may subsidiarily contain a known cyan dye other than the phthalocyanine dye represented by formula (I) or (II) in an amount of 50% by mole based on the total amount of the dyes in the ink.

The ink containing the dye according to the invention is characterized by further containing a compound capable of accelerating aggregation of the cyan dye in the solution. The compound capable of accelerating aggregation of the dye in the solution can be confirmed by the appearance of aggregation absorption in an absorption spectrum of the phthalocyanine dye represented by formula (I) or (II). When an image is drawn by using the ink containing the compound capable of accelerating aggregation of dye in the solution, the dye is present in the state of aggregation with the compound in the image formed. Thus, the resistance to light, heat and oxidation atmosphere, which is an object of the invention, can be achieved without adversely affecting the image quality, for example, color hue or gradation.

The compound capable of accelerating aggregation of dye is selected from heterocyclic or chain-like low molecular weight compounds that may be substituted with a hydroxy group, an amino group or a thiol group. The low molecular weight compound preferably has a molecular eight of 5,000 or less.

Preferred examples of the compound capable of accelerating aggregation of dye include guanidine, amidine, amides, thioamides, for example, thiosemicarbazide, thiourea, pyrazole substituted with a hydroxy group, a thiol group or an amino group, imidazole substituted with a hydroxy group, a thiol group or an amino group, thiazole substituted with a hydroxy group, a thiol group or an amino group, oxazole substituted with a hydroxy group, a thiol group or an amino group, triazole substituted with a hydroxy group, a thiol group or an amino group, isothiazole substituted with a hydroxy group, a thiol group or an amino group, isoxazole substituted with a hydroxy group, a thiol group or an amino group, thiadiazole substituted with a hyroxy group, a thiol group or an amino group, oxadiazole substituted with a hydroxy group, a thiol group or an amino group, tetrazole substituted with a hydroxy group, a thiol group or an amino group, pyridine substituted with a hydroxy group, a thiol group or an amino group, pyridazine substituted with a hydroxy group, a thiol group or an amino group, pyrazine substituted with a hydroxy group, a thiol group or an amino group, pyrimidine substituted with a hydroxy group, a thiol group or an amino group and triazine substituted with a hydroxy group, a thiol group or an amino group. The guanidine, amidine, amides, thioamides and thiourea may be substituted with a methyl group, an ethyl group or a hydroxy group. Of the compounds, the heterocyclic compounds, unsubstituted amidine, unsubstituted guanidine and unsubstituted thiourea are more preferable.

The amount of the compound capable of accelerating aggregation of dye added to an ink is preferably from 0.0001 to 10 times by weight, more preferably from 0.001 to 10 times by weight, and particularly preferably from 0.01 to 5 times by weight based on the amount of the dye.

Of the compounds capable of accelerating aggregation of dye, examples of those particularly preferred include compounds represented by the following formula (K):

$$X\text{—}NH\text{—}C(\text{—}Y)\text{=}Z \quad (K)$$

wherein, X represents a hydrogen atom, an amino group, an aryl group, a heterocyclic group, an alkenyl group, an alkynyl group or a group represented by C(=P)=Q (wherein P represents a hydrogen atom, a hydroxy group, an amino group, an alkyl group, an aryl group, a heterocyclic group, an alkenyl group, an alkynyl group, an alkylamino group, an arylamino group, an alkoxy group or an aryloxy group, and Q represents an oxygen atom, a sulfur atom or a substituted nitrogen atom); Y represents a hydrogen atom, a hydroxy group, an amino group, an alkyl group, an aryl group, a heterocyclic group, an alkenyl group, an alkynyl group, an alkylamino group, an arylamino group, an alkoxy group or an aryloxy group, and Q represents an oxygen atom, a sulfur atom or a nitrogen atom; Z represents an oxygen atom, a sulfur atom or a substituted nitrogen atom, or any two of X, Y and Z may be combined each other to form a ring.

Specific examples of the compound represented by formula (K) are set forth below, but the compounds capable of accelerating aggregation of dye that are preferably used in the invention should not be construed as being limited thereto.

(aa)
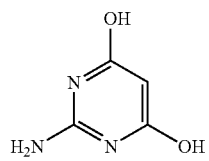

(ab)
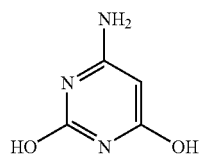

(ac)
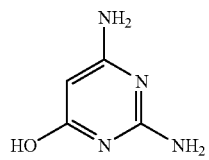

(ad)
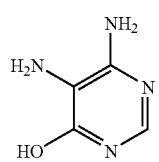

(ae)
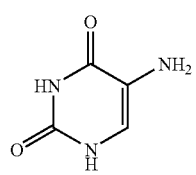

(af)
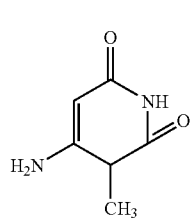

-continued (ag)
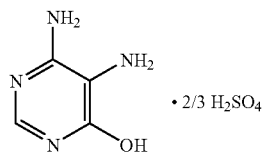

(ah)
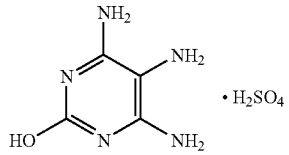

(ai)
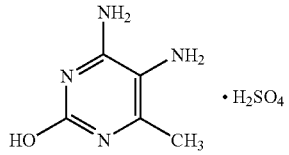

(aj)
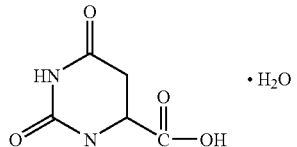

(ak)
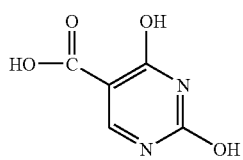

(al)
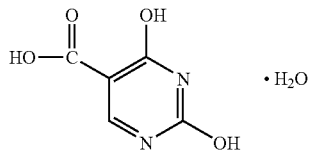

(am)
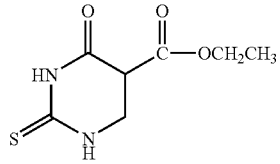

(an)
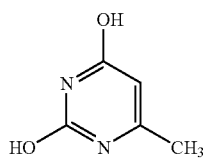

(ao)
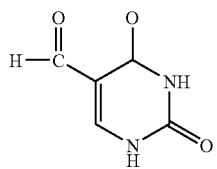

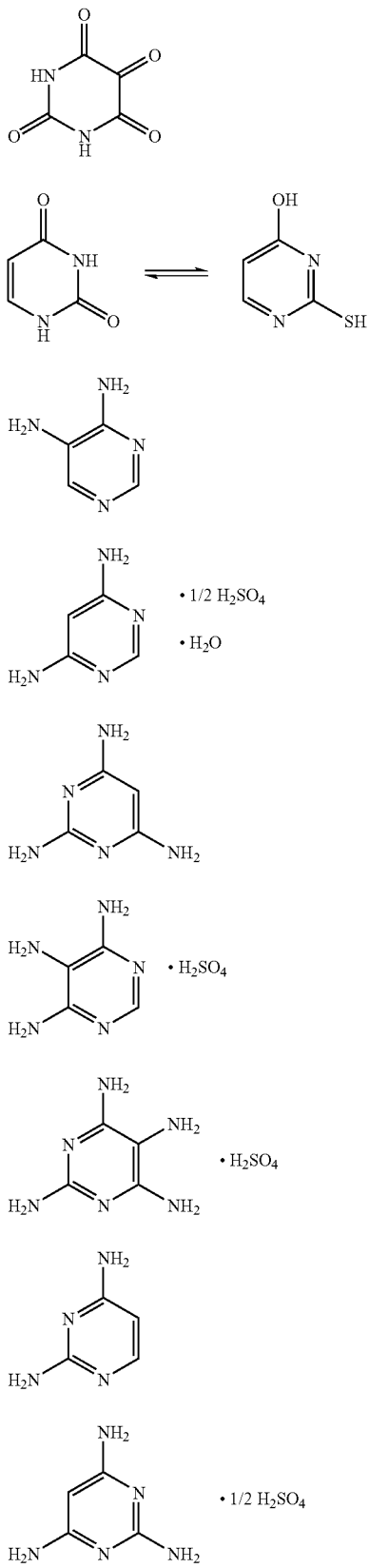
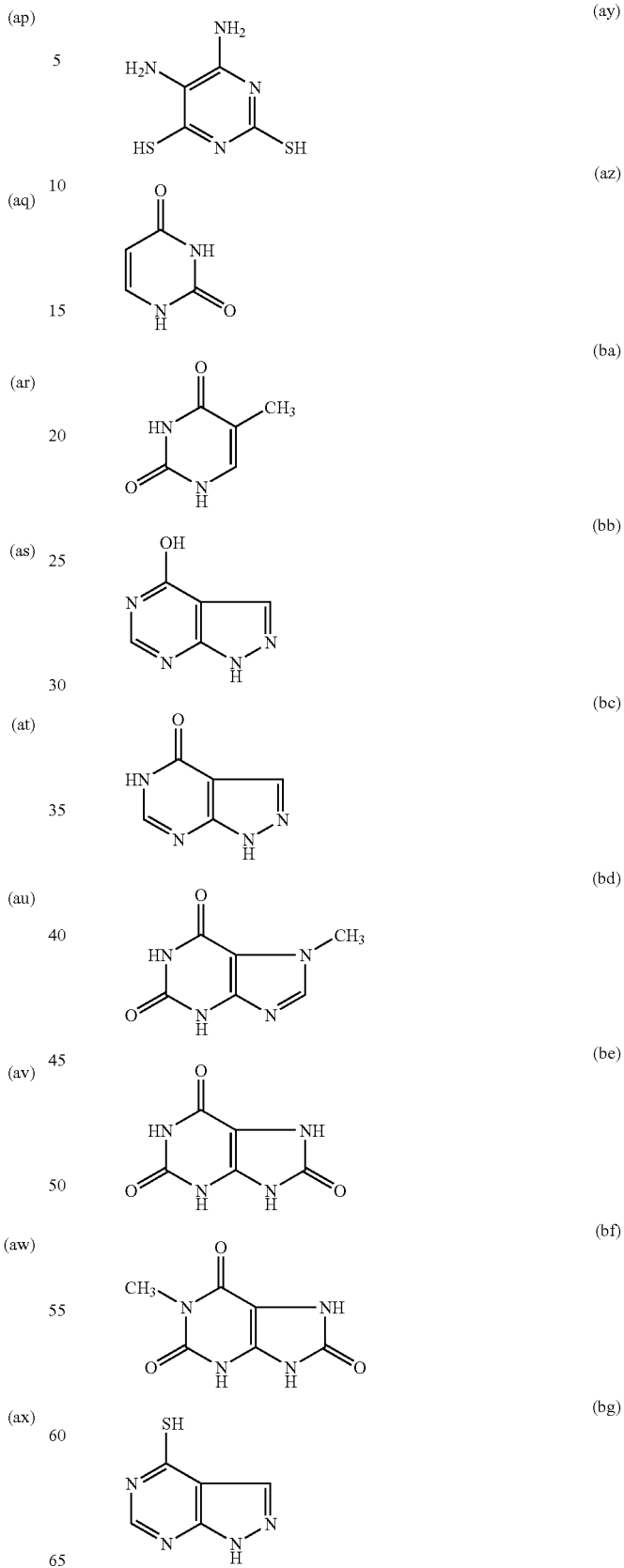

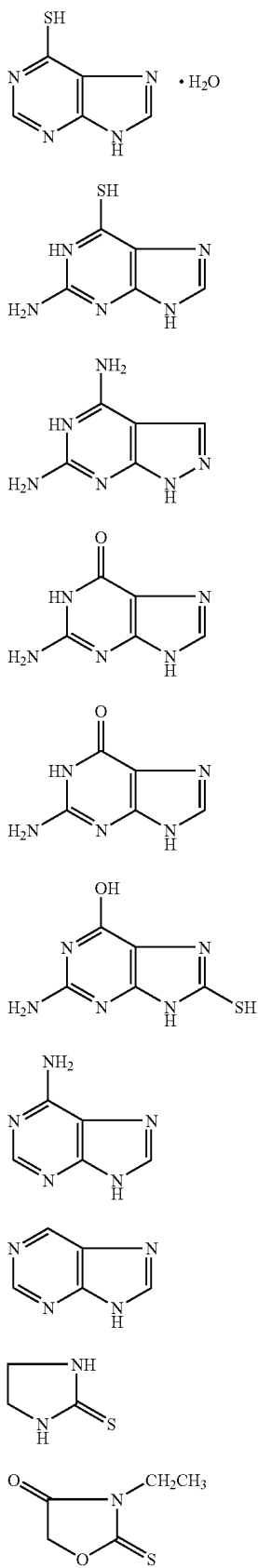

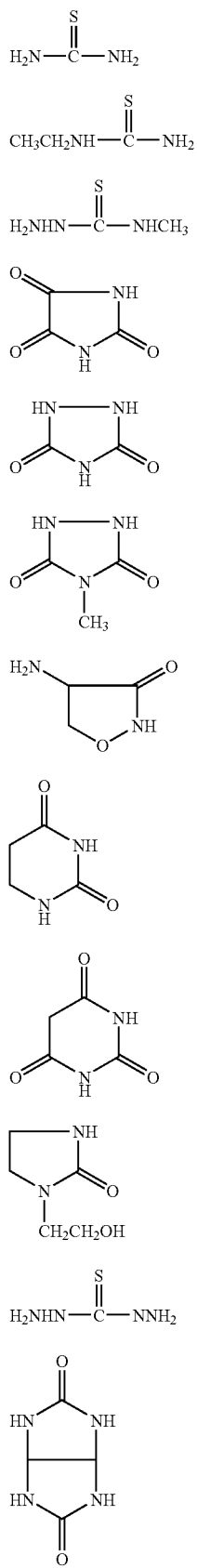
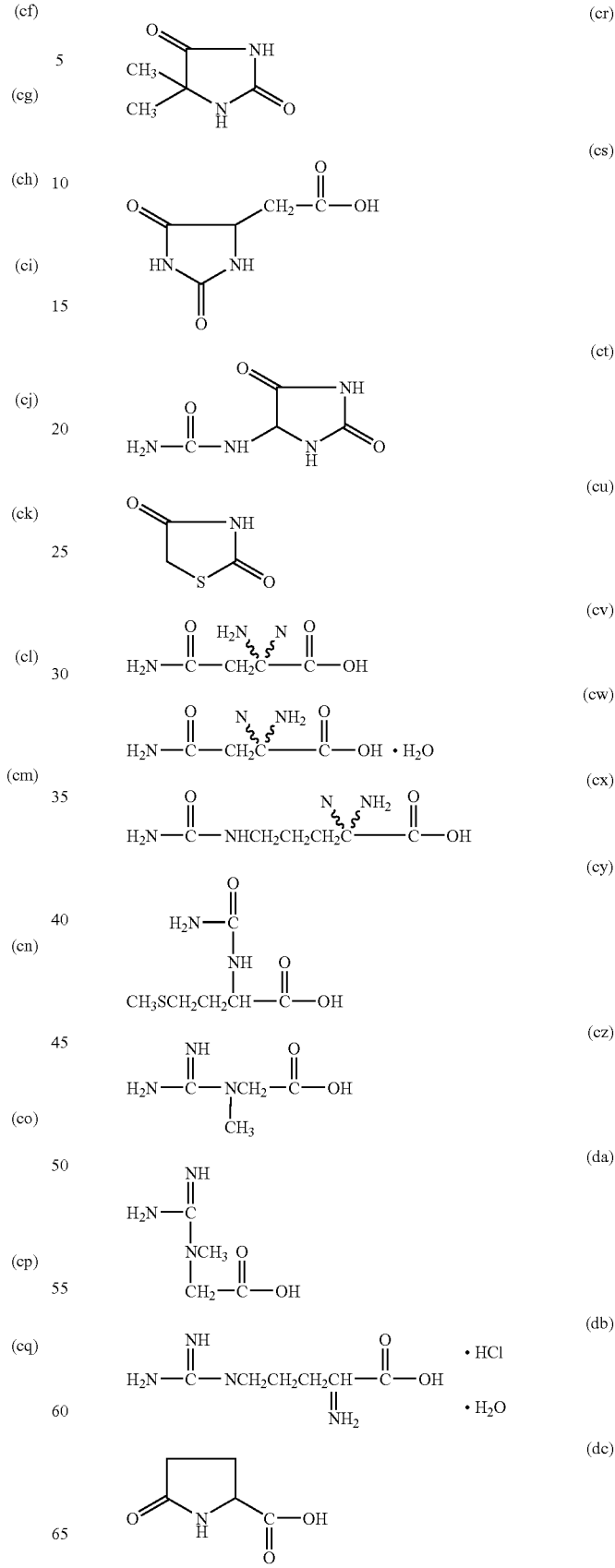

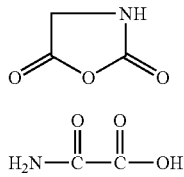

(dd)

(de)

In the preparation of ink solution of the invention, it is preferred in case of an aqueous ink that the dye is first dissolved in water. Then, various solvents and additives are added to the solution thereby dissolving and mixing to form a uniform ink solution.

As for the dissolution of dye, various methods, for example, dissolution by stirring, dissolution by means of ultrasonic wave irradiation or dissolution by shaking can be used. The method of dissolution by stirring is particularly preferably used. In case of performing the stirring, various systems, for example, flow stirring known in the field of art or stirring utilizing shear force by means of a reversal aditor or dissolver can be employed. On the other hand, a stirring method utilizing shear force with a bottom surface of container, for example, a magnetic stirrer can also preferably used.

Examples of the water-miscible organic solvent for use in the invention include alcohols (e.g., methanol, ethanol, propanol, isopropanol, butanol, isobutanol, sec-butanol, tert-butanol, pentanol, hexanol, cyclohexanol or benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol or thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether or ethylene glycol monophenyl ether), amines (e.g., ethanolamine, diethanolamine, triethanolamine, N-methyldiethanolamine, N-ethyldiethanolamnine, ethylenediamine, diethylenetriamine, triethylenetetramine, polyethyleneimine or tetramethylpropylenediamine) and other polar solvents (e.g., formamide, N,N-dimethylformamide, N,N-dimethylacetamide, dimethylsulfoxide, sulfolane, acetonitrile or acetone). The water-miscible organic solvents may be used in combination of two or more thereof.

In the case where the phthalocyanine dye is an oil-soluble dye, the ink solution can be prepared by dissolving the oil-soluble dye in a high boiling point organic solvent and subjecting the resulting solution to emulsion-dispersion in an aqueous medium.

The high boiling point organic solvent for use in the invention has a boiling point of 150° C. or higher, preferably 170° C. or higher.

Examples of the high boiling point organic solvent include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate or bis(1,1-diethylpropyl)phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate or di-2-ethylhexylphenyl phosphate), benzoic acid esters (e.g., 2-ethylhexyl benzoate, dodecyl benzoate, 2,4-dichlorobenzoate, dodecyl benzoate, 2-ethylhexyl-p-hydroxybenzoate), amides (e.g., N,N-diethyldodecanamide or N,N-diethyllaurylamide), alcohols or phenols (e.g., isostearyl alcohol or 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate or trioctyl citrate), aniline, derivatives (e.g., N,N-dibutyl-2-butoxy-5-tert-octylaniline), chlorinated paraffins (e.g., paraffins having a chlorine content of from 10 to 80%), trimesic acid esters (e.g., tributyl trimesate), dodecylbenzene, diisopropylnaphthalene, phenols (e.g., 2,4-di-tert-amylphenyl, 4-dodecyloxyphenol, 4-dodecyloxycarbonylphenol or 4-(4-dodecyloxyphenylsulfonyl) phenol), carboxylic acids (e.g., 2-(2,4di-tert-amylphenoxy) butyric acid or 2-ethoxyoctanedecanoic acid) and alkylphosphoric acids (e.g., di-(2-ethylhexyl)phosphoric acid or diphenylphosphoric acid). The high boiling point organic solvent is used in an amount of from 0.01 to 3.0 times, preferably from 0.01 to 1.0 time in terms of a weight ratio of the high boiling point organic solvent to the oil-soluble dye.

The high boiling point organic solvents may be used individually or as a mixture of several kinds thereof (for example, a mixture of tricresyl phosphate and dibutyl phthalate, trioctyl phosphate and di(2-ethylhexyl)sebacate, or dibutyl phthalate and poly(N-tert-butylacrylamide)

Examples of the high boiling point organic solvent for use in the invention other than the above-described compounds, and the synthesis methods of the high boiling point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 41363,873, 4,430,421, 4,430,422, 4,464,464, 4,483,918, 4,540,657, 4,684,606, 4,728,599, 4,745,049, 4,935,321 and 5,013,639, EP-A-276,319, EP-A-286,253, EP-A-289,820, EP-A-309,158, EP-A-309,159, EP-A-309,160, EP-A-509,311, EP-A-510,576, East German Patents 147,009, 157,147, 159,573 and 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

In the invention, the oil-soluble dye and high boiling point organic solvent are used by subjecting them to emulsion-dispersion in an aqueous medium. Depending on circumstances, a low boiling point organic solvent may also be used together at the emulsion-dispersion in view of emulsifiability. The low boiling point organic solvent used together is an organic solvent having a boiling point of from about 30 to 150° C. at an atmospheric pressure. Preferred examples thereof include esters (e.g., ethyl acetate, butyl acetate, ethyl propionate, β-ethoxyethyl acetate or methylcellosolve acetate), alcohols (e.g., isopropyl alcohol, n-butyl alcohol or secondary butyl alcohol), ketones (e.g., methyl isobutyl ketone, methyl ethyl ketone or cyclohexanone), amides (e.g., dimethylformamide or N-methylpyrrolidone) and ethers (e.g., tetrahydrofuran or dioxane), however, the present invention should not be construed as being limited thereto.

In the emulsion-dispersion, an oil phase obtained by dissolving the dye in a high boiling organic solvent or depending on circumstances, in a mixed solvent of a high boiling organic solvent and a low boiling organic solvent is dispersed in an aqueous phase mainly comprising water to form fine oil droplets of the oil phase. In this regard, an additive described hereinafter, for example, a surfactant, a wetting agent, a dye stabilizer, an emulsification stabilizer, an antiseptic or a fungicide can be added to either one or both of the aqueous phase and oil phase, if desired.

While a method of adding an oil phase to an aqueous phase is ordinary used for the emulsification method, a so-called phase inversion emulsification method wherein an aqueous phase is dropwise added to an oil phase can also be preferably used.

In performing the emulsion-dispersion of the invention, various surfactants can be used. Preferred examples of the surfactant include anionic surfactants, for example, fatty acid salts, alkylsulfuric ester salts, alkylbenzenesulfonates, alkylnaphthalenesulfonates, dialkylsulfosuccinates, alkylphosphoric ester salts, naphthalenesulfonic acid formalin condensates or polyoxyethylene alkylsulfuric ester salts, and nonionic surfactants, for example, polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters or oxyethylene oxypropylene block copolymers. Also, SURFYNOLS (manufactured by Air Products & Chemicals), which are acetylene-base polyoxyethylene oxide surfactants, are preferably used. Further, amine oxide-type amphoteric surfactants, for example, N,N-dimethyl-N-alkylamine oxide, are preferred. In addition, surfactants described in JP-A-59-157636, pages (37) to (38) and *Research Disclosure*, No. 308119 (1989) can also be used.

The surfactant used for the emulsification has a different purpose from a surfactant added for the purpose of adjusting physical properties of the ink for inkjet recording as described hereinafter. However, the same surfactant can be used for both purposes thereby caring out the function of adjusting physical properties of the ink.

For the purpose of stabilizing the dispersion immediately after the emulsification, a water-soluble polymer may be added together with the surfactant. Preferred examples of the water-soluble polymer include polyvinyl alcohol, polyvinylpyrrolidone, polyethylene oxide, polyacrylic acid, polyacrylamide and copolymers thereof. Also, natural water-soluble polymers, for example, polysaccharides, casein or gelatin are also preferably used.

Further, for stabilization of the dye dispersion, a polymer which does not substantially dissolve in an aqueous medium, for example, vinyl polymers obtained by polymerization of acrylic acid esters, methacrylic acid esters, vinyl esters, acrylamides, methacrylamides, olefins, styrenes, vinyl ethers or acrylonitriles, polyurethanes, polyesters, polyamides, polyureas or polycarbonates can also be used together. The polymer preferably contains $-SO_3^-0$ or $-COO^-$. In the case of using such a polymer which does not substantially dissolve in an aqueous medium, the polymer is preferably used in an amount of 20% by weight or less, more preferably 10% buy weight or less, based on the high boiling point organic solvent.

In the preparation of an aqueous ink by dispersing the oil-soluble dye and high boiling point organic solvent according to emulsion-dispersion, it is particularly important to control of the particle size. In order to improve color purity and density of the image formed by the inkjet recording method, it is essential to reduce the average particle size. The average particle size is preferably 1 μm or less, more preferably from 5 to 100 nm in terms of the volume average particle size.

The volume average particle size and particle size distribution of the dispersed particles can be easily measured by a known method, for example, a static light scattering method, a dynamic light scattering method, a centrifugal precipitation method and the method described in *Jikken Kagaku Koza* (*Lecture of Experimental Chemistry*), 4th ed., pp. 417–418.

For instance, the ink is diluted with distilled water so as to have a particle concentration of from 0.1 to 1% by weight, and then the particle size can be easily measured by a commercially available volume average particle size measuring apparatus (for example, Microtrac UPA, manufactured by Nikkiso Co., Ltd.). The dynamic light scattering method utilizing a laser Doppler effect is particularly preferred because even a particle size of small particles can be measured.

The volume average particle size is an average particle size weighted with the particle volume and it is obtained by multiplying the diameter of individual particles by the volume of the individual particles and dividing the sum total of the obtained values by the total volume of particles. The volume average particle size is described in Soichi Muroi, *Kobunshi Latex no Kagaku* (*Chemistry of Polymer Latex*), page 119, Kobunshikankokai Co., Ltd.

Also, it is revealed that the presence of coarse particles greatly affects the printing performance. More specifically, the coarse particles clog the nozzle of head or even if the nozzle is not clogged, they form a soil to bring about failure or twist in the ejection of ink, whereby the printing performance is seriously affected. In order to prevent such troubles, it is important to reduce the number of particles having a particle size of 5 μm or more to 10 or less and the number of particles having a particle size of 1 μm or larger to 1,000 or less, in 1 μl of the ink prepared.

For removing the coarse particles, a known method, for example, centrifugal separation or microfiltration can be used. The separation step may be performed immediately after the emulsion-dispersion or may be performed immediately before filling the ink in an ink cartridge after various additives, for example, a wetting agent or a surfactant are added to the emulsified dispersion.

A mechanically emulsifying apparatus is effective employed for reducing the average particle size and eliminating coarse particles.

As for the emulsifying apparatus, known apparatuses, for example, a simple stirrer or impeller stirring system, an in-line stirring system, a mill system (e.g., colloid mill) and an ultrasonic system can be used, however, a high-pressure homogenizer is particularly preferably used.

A mechanism of the high-pressure homogenizer is described in detail in U.S. Pat. No. 4,533,254 and JP-A-6-47264. Examples of commercially available apparatus include Gaulin Homogenizer (manufactured by A.P.V Gaulin Inc.), Microfluidizer (manufactured by Microfluidex Inc.) and Altimizer (manufactured by Sugino Machine Ltd.).

A high-pressure homogenizer with a mechanism of pulverizing particles in an ultrahigh pressure jet stream recently described in U.S. Pat. No. 5,720,551 is particularly effective for the emulsion-dispersion of the invention. Examples of the emulsifying apparatus using such ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, and more preferably 180 MPa or more.

A method of using two or more emulsifying apparatuses, for example, by performing the emulsification in a stirring emulsifier and then passing the emulsified product through a high-pressure homogenizer is particularly preferred. Also, a method of once performing the emulsion-dispersion by such an emulsifying apparatus, adding additive, for example, a wetting agent or a surfactant, and then again passing the dispersion through a high-pressure homogenizer before the time of filling the ink into a cartridge is preferred.

In the case of containing a low boiling point organic solvent in addition to a high boiling point organic solvent, the low boiling point organic solvent is preferably removed in view of stability of the emulsified product, safety and hygiene. For removing the low boiling point organic solvent, various known methods can be used depending on the kind of the solvent. Examples of the method include evaporation, vacuum evaporation and ultrafiltration. The removal of the low boiling point organic solvent is preferably performed as soon as possible immediately after the emulsification.

The incorporation of the surfactant into the ink for inkjet recording of the invention to adjust the liquid physical properties of the ink can bring about excellent effects, for example, improvement in the ejection stability of the ink, improvement in water resistance of the image and prevention of bleeding of the printed ink.

Examples of the surfactant include anionic surfactants, for example, sodium dodecylsulfate, sodium dodecyloxysulfonate or sodium alkylbenzenesulfonate, cationic surfactants, for example, cetylpyridinium chloride, trimethylcetylammonium chloride or tetrabutylammonium chloride, and nonionic surfactants, for example, polyoxyethylene nonyl phenyl ether, polyoxyethylene naphthyl ether or polyoxyethylene octyl phenyl ether. Among them, nonionic surfactants are particularly preferably used.

The content of the surfactant content is from 0.001 to 15% by weight, preferably from 0.005 to 10% by weight, more preferably from 0.01 to 5% by weight based on the ink.

In the ink for inkjet recording according to the invention, an additive, for example, a drying inhibitor for preventing clogging due to drying of ink at the ejection port, a permeation accelerator for attaining better permeation of ink into paper, an ultraviolet absorbent, an antioxidant, a viscosity adjusting agent, a surface tension adjusting agent, a dispersant, a dispersion stabilizer, a fungicide, a rust inhibitor, a pH adjusting agent, a defoaming agent or a chelating agent can be appropriately selected and used in an appropriate amount.

The drying inhibitor for use in the invention is preferably a water-soluble organic solvent having a vapor pressure lower than water. Specific examples thereof include polyhydric alcohols, for example, ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin or trimethylolpropane; lower alkyl ethers of polyhydric alcohol, for example, ethylene glycol monomethyl(or ethyl) ether, diethylene glycol monomethyl(or ethyl) ether or triethylene glycol monoethyl(or butyl) ether; heterocyclic compounds, for example, 2-pyrrolidone, N-methyl-2-pyrrolidone, 1,3-dimethyl-2-imidazolidinone or N-ethylmorpholine; sulfur-containing compounds, for example, sulfolane, dimethylsulfoxide or 3-sulfolene; polyfunctional compounds, for example, diacetone alcohol or diethanolamine; and urea derivatives. Among them, a polyhydric alcohol, for example, glycerin or diethylene glycol is preferred. The drying inhibitors may be used individually or in combination of two or more thereof. The drying inhibitor is preferably contained in an amount of from 10 to 50% by weight in the ink.

Examples of the permeation accelerator which can be used in the invention include alcohols, for example, ethanol, isopropanol, butanol, di(tri)ethylene glycol monobutyl ether or 1,2-hexanediol, sodium laurylsulfate, sodium oleate and nonionic surfactants. A sufficiently good effect can be obtained by adding from 10 to 30% by weight of the permeation accelerator to the ink. The permeation accelerator is preferably used in an amount of causing no bleeding of printed letter or no print through.

Examples of the ultraviolet absorbent which can be used in the invention for improving the preservability of image include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure*, No. 24239, and compounds of absorbing ultraviolet light and emitting fluorescent light, so-called fluorescent brightening agents, represented by stilbene-base compounds and benzoxazole-base compounds.

As the antioxidant which can be used in the invention for improving the preservability of image, various organic or metal complex discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic compounds. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and specific examples thereof described in JP-A-62-215272 (pages 127 to 137) can be used.

Examples of the fungicide for use in the invention include sodium dehydroacetate, sodium benzoate, sodium pyridinethione-1-oxide, ethyl p-hydroxybenzoate, 1,2-benzisothiazolin-3-one and salt thereof. The fungicide is preferably used in an amount of from 0.02 to 5.00% by weight in the ink.

The fungicide is described in detail in *Bokin Bobai Zai Jiten (Dictionary of Microbicide and Fungicide)*, compiled by Nippon Bokin Bobai Gakkai Jiten Henshu Iinkai.

Examples of the rust inhibitor include acidic sulfite, sodium thiosulfate, ammonium thioglycolate, diisopropylammonium nitrite, pentaerythritol tetranitrate, dicyclohexylammonium nitrite and benzotriazole. The rust inhibitor is preferably used in an amount of 0.02 to 5.00% by weight in the ink.

The pH adjusting agent for use in the invention can be suitably used for adjusting the pH and imparting dispersion stability. The pH of the ink is preferably adjusted to from 8 to 11 at 25° C. When the pH is less than 8, the solubility of dye decreases to readily cause clogging of a nozzle, whereas when it exceeds 11, the water resistance is liable to deteriorate. Examples of the pH adjusting agent include organic bases and inorganic alkalis for basic compounds, and organic acids and inorganic acids for acidic compounds.

Examples of the organic base include triethanolamine, diethanolamine, N-methyldiethanolamine and dimethylethanolamine. Examples of the inorganic alkali include alkali metal hydroxides (e.g., sodium hydroxide, lithium hydroxide or potassium hydroxide), alkali metal carbonates (e.g., sodium carbonate or sodium hydrogencarbonate) and ammoniums. Examples of the organic acid include acetic acid, propionic acid, trifluoroacetic acid and an alkylsulfonic acid. Examples of the inorganic acid include hydrochloric acid, sulfuric acid and phosphoric acid.

In the invention, apart from the above-described surfactants, a nonionic, cationic or anionic surfactant is used as the surface tension adjusting agent. Examples thereof include anionic surfactants, for example, a fatty acid salt, an alkylsulfuric ester salt, an alkylbenzenesulfonate, an alkylnaphthalenesulfonate, a dialkylsulfosuccinate, an alkylphosphoric ester salt, a naphthalenesulfonic acid formalin condensate or a polyoxyethylenealkylsulfuric ester salt, and nonionic surfactants, for example, a polyoxyethylene alkyl ether, a polyoxyethylene alkylaryl ether, a polyoxyethylene fatty acid ester, a sorbitan fatty acid ester, a polyoxyethylene sorbitan fatty acid ester, a polyoxyethylene alkylamine, a glycerin fatty acid ester and an oxyethylene oxypropylene block copolymer. Also, SURFYNOLS (manufactured by Air Products & Chemicals), which are acetylene-base polyoxyethylene oxide surfactants, are preferably used. Further, amine oxide-type amphoteric surfactants, for example, N,N-dimethyl-N-alkylamine oxide, are preferred. In addition, surfactants described in JP-A-59-157636, pages (37) to (38) and *Research Disclosure*, No. 308119 (1989) can also be used.

By using or not using such a surface tension adjusting agent, the surface tension of the ink of the invention is preferably controlled in a range of from 20 to 60 mN/m, more preferably from 25 to 45 mN/m.

The viscosity of the ink for use in the invention is preferably controlled 30 mPa·s or less, more preferably 20 mPa·s or less. For the purpose of controlling the viscosity, a viscosity controlling agent may be sometimes used. Examples of the viscosity controlling agent include celluloses, water-soluble polymers, for example, polyvinyl alcohol, and nonionic surfactants. They are described in detail in *Nendo Chosei Gijutsu (Viscosity Controlling Technology)*, Chap. 9, Gijutsu Joho Kyokai (1999), and *Inkjet Printer Yo Chemicals* (98 Zoho)—*Zairyo no Kaihatsu Doko.Tenbo Chosa—(Chemicals for Inkjet Printer (Enlarged Edition of 98)—Survey on Tendency.Prospect of Development of Materials—)*, pp. 162–174, CMC Publishing Co., Ltd. (1997).

In the invention, if desired, the above-described various cationic, anionic and nonionic surfactants can be used as the dispersant or dispersion stabilizer, fluorine-base or silicone-base compounds can be used as the defoaming agent, and the chelating agents represented by EDTA and the like can be used.

The recording paper and recording film for use in the image recording method using the ink of the invention are described below. A support that can be used for the recording paper or recording film comprises, for example, from a chemical pulp such as LBKP and NBKP, a mechanical pulp such as GP, PGW, RMP, TMP, CTMP, CMP and CGP or a waste paper pulp such as DIP, and produced by mixing the pulp, if desired, with conventionally known additives, for example, a pigment, a binder, a sizing agent, a fixing agent, a cation agent or a paper strength increasing agent, and then making paper by various machines, for example, Fourdrinier paper machine or cylinder paper machine. In addition, synthetic paper or a plastic film may be used as the support. A thickness of the support is preferably from 10 to 250 μm and a basis weight thereof is preferably from 10 to 250 g/m².

An image-receiving layer and a backcoat layer may be provided on the support to produce an image-receiving material, or after providing a size press or an anchor coat layer using starch, polyvinyl alcohol or the like, an ink-receiving layer and a backcoat layer may be provided to produce an image-receiving material. The support may be further subjected to a planarizing treatment by a calendering machine, for example, machine calender, TG calender and soft calender.

In the invention, paper both surfaces of which are laminated with polyolefin (for example, polyethylene, polystyrene, polybutene or a copolymer thereof) or polyethylene terephthalate, or a plastic film is more preferably used as the support. To the polyolefin, a white pigment (for example, titanium oxide or zinc oxide) or a tinting dye (for example, cobalt blue, ultramarine or neodymium oxide) is preferably added.

The image-receiving layer provided on the support contains a porous material or an aqueous binder. Also, the image-receiving layer preferably contains a pigment and the pigment is preferably a white pigment. Examples of the white pigment include an inorganic white pigment, for example, calcium carbonate, kaolin, talc, clay, diatomaceous earth, synthetic amorphous silicai aluminum silicate, magnesium silicate, calcium silicate, aluminum hydroxide, aluminai lithopone, zeolite, barium sulfate, calcium sulfate, titanium dioxide, zinc sulfide or zinc carbonate and an organic pigment, for example, a styrene-base pigment, a acryl-base pigment, a urea resin and a melamine resin. Among them, porous inorganic white pigments are preferred, and synthetic amorphous silica or the like having a large pore area are particularly preferred. The synthetic amorphous silica may be either a silicic acid anhydride obtained by a dry production method (vapor phase method) or a silicic acid hydrate obtained by a wet production method.

Specific examples of the recording paper containing the pigment in the image-receiving layer include those described in JP-A-10-81064, JP-A-10-119423, JP-A-10-157277, JP-A-10-217601, JP-A-10-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of the aqueous binder contained in the image-receiving layer include a water-soluble polymer, for example, polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide or a polyalkylene oxide derivative, and a water-dispersible polymer, for example, a styrene butadiene latex or an acryl emulsion. The aqueous binders can be used individually or in combination of two or more thereof. Among them, polyvinyl alcohol and silanol-modified polyvinyl alcohol are preferred in the invention in view of adhesion to the pigment and adherence of the image-receiving layer to the support.

The image-receiving layer may contain a mordant, a water-proofing agent, a light fastness improver, a gas resistance improver, a surfactant, a hardening agent and other additives in addition to the pigment and the aqueous binder. The mordant added to the image-receiving layer is preferably immobilized. For such a purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in JP-A-1-161236 is used, an image having excellent image quality is obtained and at the same time, light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, dimethyldiallylammonium chloride polymer and cation polyacrylamide. The content of the cationic resin is preferably from 1 to 15% by weight, more preferably from 3 to 10% by weight, based on the entire solid content of the image-receiving layer.

Examples of the light fastness improver and gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxy group-containing, organic acids, benzotriazole compounds, benzophenone compounds, triazine compounds, heterocyclic compounds, water-soluble metal salts, organic metal compounds and metal complexes.

Specific examples of the compounds include those described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258 and JP-A-11-321090.

The surfactant functions as a coating aid, an adherence improver, a slipperiness improver or an antistatic agent. The surfactant is described in JP-A-62-173463 and JP-A-62-183457.

In place of the surfactant, an organic fluoro compound may be used. The organic fluoro compound is preferably hydrophobic. Examples of the organic fluoro compound include fluorine-containing surfactants, oily fluorine-base compounds (for example, fluorine oil) and solid fluorine compound resins (for example, ethylene tetrafluoride resin). The organic fluoro compound is described in JP-B-57-9053 (columns 8 to 17), JP-A-61-20994 and JP-A-62-135826.

As the hardening agent, for example, the materials described in JP-A-1-161236 (page 222), JP-A-9-263036, JP-A-10-119423 and JP-A-2001-310547 can be used.

Other examples of the additive added to the image-receiving layer include a pigment dispersant, a thickener, a defoaming agent, a dye, a fluorescent brightening agent, an antiseptic, a pH adjusting agent and a matting agent. The image-receiving layer may be composed of one layer or two layers.

In the recording paper or recording film, a backcoat layer may also be provided. Examples of components that can be added to the layer include a white pigment, an aqueous binder and other components.

Examples of the white pigment contained in the backcoat layer include an inorganic white pigments, for example, precipitated calcium carbonate light, ground calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silicai colloidal silicai colloidal alumina, pseudoboehmite, aluminum hydroxide, aluminai lithopone, zeolite, hydratedd halloysite, magnesium carbonate and magnesium hydroxide, and organic pigments, for example, styrene-base plastic pigment, acryl-base plastic pigment, polyethylene, microcapsule, urea resin and melamine resin.

Examples of the aqueous binder contained in the backcoat layer include water-soluble polymers, for example, styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers, for example, a styrene butadiene latex and an acryl emulsion. Other examples of the component contained in the backcoat layer include a defoaming agent, a foam inhibitor, a dye, a fluorescent brightening agent, an antiseptic and a water-proofing agent.

To a constituent layer (including the backcoat layer) of the inkjet recording paper or recording film, a polymer fine particle dispersion may be added. The polymer fine particle dispersion is used for the purpose of improving film properties, for example, stabilizing dimension and preventing curling, adhesion or film cracking. The polymer fine particle dispersion is described in JP-A-62-245258, JR-A-62-136648 and JP-A-62-110066. When a polymer fine particle dispersion having a low glass transition temperature (40° C. or lower) is added to a layer containing a mordant, the layer can be prevented from cracking or curling. The curling can be prevented also by adding a polymer fine particle dispersion having a high glass transition temperature to the back layer.

According to the invention, the inkjet recording system is not limited and a known system may be used, for example, an electric charge controlling system of ejecting an ink utilizing the electrostatic induction force, a drop-on-demand system (pressure pulse system) utilizing an oscillation pressure of a piezoelectric element, an acoustic inkjet system wherein electric signals are converted into acoustic beams and the beams irradiate an ink to eject the ink using the radiation pressure, and a thermal inkjet (bubble jet) system of heating an ink to form a bubble and ejecting the ink utilizing the generated pressure.

The inkjet recording system includes a system of ejecting a large number of small-volume ink droplets of so-called photo ink having a low concentration, a system of improving the image quality using a plurality of inks having substantially the same color hue but different in the concentration, and a system using a colorless transparent ink.

The inkjet recording ink of the invention can also be used for the uses other than the inkjet recording, for example, a material for display image, an image-forming material for interior decoration and an image-forming material for outdoor decoration.

Examples of the material for display image include various materials such as poster, wall paper, ornamental articles (e.g., decorative figurine or doll), handbill for commercial advertisement, wrapping paper, wrapping material, paper bag, vinyl bag, package material, billboard, image drawn on or attached to the side surface of transportation facilities (e.g., automobile, bus or electric car), and clothing with a logo. In the case of using the ink of the invention as a material for forming a display image, the image includes not only a narrow definition of image but also all patterns by an ink, which can be acknowledged by a human, such as abstract design, letter and geometrical pattern.

Examples of the material for interior decoration include various materials such as wallpaper, ornamental articles (e.g., decorative figurine or doll), luminaire member, furniture member and design member of floor or ceiling. In the case of using the ink of the invention as a material for forming an image, the image includes not only a narrow definition of image but also all patterns by an ink, which can be acknowledged by a human, such as abstract design, letter and geometrical pattern.

Examples of the material for outdoor decoration include various materials such as wall material, roofing material, billboard, gardening material, outdoor ornamental articles (e.g., decorative figurine or doll) and outdoor luminaire member. In the case of using the ink of the invention as a material for forming an image, the image includes not only a narrow definition of image but also all patterns by an ink, which can be acknowledged by a human, such as abstract design, letter and geometrical pattern.

In these uses, examples of the medium on which the pattern is formed include various materials, for example, paper, fiber, cloth (including non-woven fabric), plastic, metal and ceramic. Examples of the dyeing form include mordanting, printing and fixing of a dye in the form of a reactive dye having introduced thereinto a reactive group. Among these, preferred is dyeing by mordanting.

The present invention will be described in more detail with reference to the following examples, but the invention should not be construed as being limited thereto.

EXAMPLES

Ultrapure water (resistively: 18 MΩ or more) was added to the components shown below to make 1 liter and the mixture was stirred for 1 hour under heating at 30 to 40° C. Then, the solution was filtered under a reduced pressure through a microfilter having an average pore size of 0.25 μm to prepare each ink solution of Cyan Ink (C), Light Cyan Ink (LC), Magenta Ink (M), Light Magenta Ink (LM), Yellow Ink (Y), Dark Yellow Ink (DY) and Black Ink (Bk) thereby preparing Ink Set 101.

| | Composition of Ink Set 101 | | | | | | |
|---|---|---|---|---|---|---|---|
| | C | LC | M | LM | Y | DY | Bk |
| Dye | C-1 45 g | C-1 15 g | M-1 30 g | M-1 10 g | Y-1 30 g | Y-1 30 g C-1 3 g M-1 5 g | Bk-1 55 g Bk-2 15 g |
| BTZ | 3 g | 3 g | 3 g | 3 g | 3 g | 3 g | 3 g |
| DGB | — | — | — | — | 90 g | 85 g | 90 g |
| TGB | 100 g | 100 g | 90 g | 90 g | — | — | — |
| DEG | 100 g | 100 g | 90 g | 80 g | — | — | — |
| TEG | — | — | — | — | 110 g | 125 g | 100 g |
| GR | 120 g | 130 g | 130 g | 120 g | 125 g | 135 g | 125 g |
| PRD | 35 g | 35 g | — | — | — | — | 35 g |
| TEA | 10 g | 10 g | 10 g | 10 g | 10 g | 10 g | 10 g |
| PRX | 1 g | 1 g | 1 g | 1 g | 1 g | 1 g | 1 g |
| SW | 10 g | 10 g | 10 g | 10 g | 10 g | 10 g | 10 g |

BTZ: Benzotriazole
UR: Urea
DGB: Diethylene glycol monobutyl ether
TGB: Triethylene glycol monobutyl ether
DEG: Diethylene glycol
TEG: Triethylene glycol
GR: Glycerin
PRD: 2-Pyrrolidone
TEA: Triethanolamine
PRX: Proxel XL2 (S) (2-benzisothiazolin-3-one, trade name, manufactured by Avecia Ltd.)
SW: Surfactant (Surfynol STG, trade name, Avecia Ltd.)

M-1
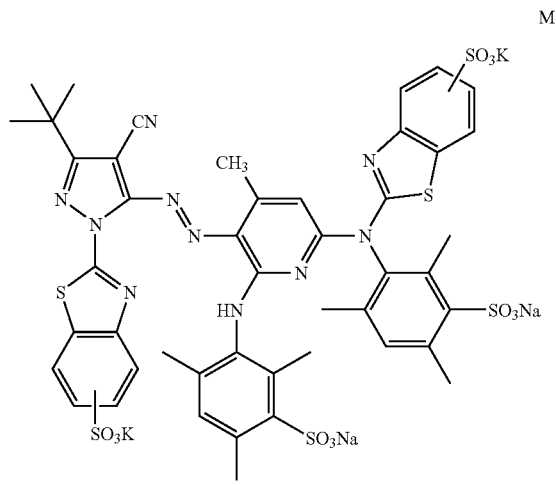
C-1
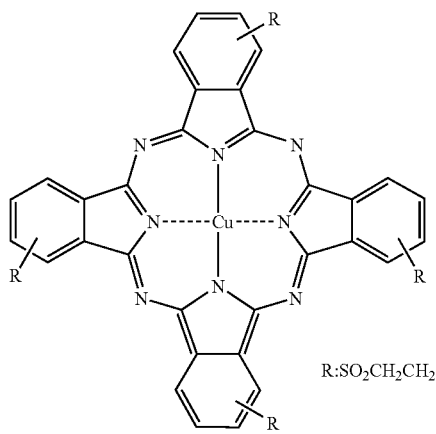
R:SO₂CH₂CH₂CH₂SO₃Li
Y-1
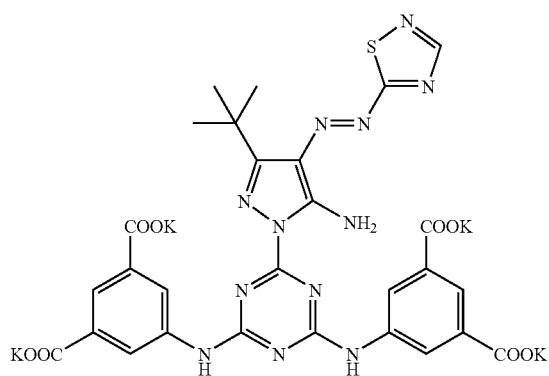
BK-1
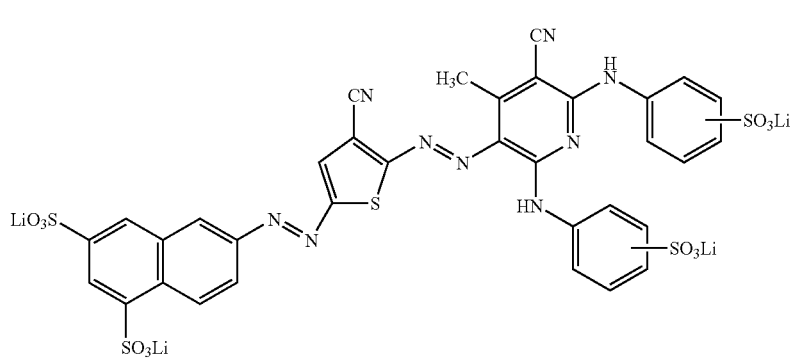
BK-2
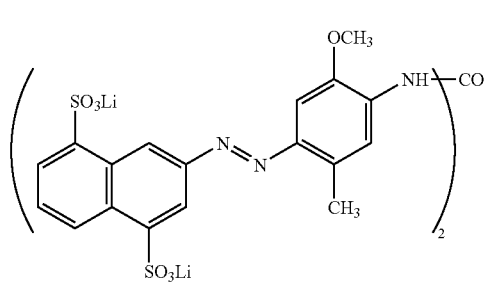

Ink Sets 102 to 109 were prepared in the same manner as in Ink Set 101 except for adding the additives shown below to both Cyan Ink and Light Cyan Ink of Ink Set 101, respectively.

| Additive | |
| --- | --- |
| Type (PM-950C) | — |
| 101 (Comparative example) | None |
| 102 (Comparative example) | Ethylene glycol 10 g |
| 103 (Comparative example) | Sucrose 10 g |
| 104 (Comparative example) | Taurine 10 g |
| 105 (Invention) | Guanidine acetate 10 g |
| 106 (Invention) | Amidine acetate 10 g |
| 107 (Invention) | Diaminotriazine 10 g |
| 108 (Invention) | 2,5-Diaminopyrazine 10 g |
| 109 (Invention) | 2,5-Diaminopirimidine 10 g |

The inks were filled in ink cartridges of inkjet printer PM-950C manufactured by Seiko Epson Corp. and a gray stepwise image pattern and a portrait were printed on an image-receiving sheet.

As the image-receiving sheet, Inkjet Paper Photo Gloss Paper "Gasai" manufactured by Fuji Photo Film Co., ltd. was used. With the printed image, image quality, ejection property of ink and fastness of image were evaluated.

(Evaluation Experiment)

1) With respect to the ejection stability, the cartridges were set on the printer, ejection of the ink from all nozzles were confirmed, the printer was stopped and allowed to stand for 240 seconds under conditions of 15° C. and 30% RH or conditions of 35° C. and 90% RH, and thereafter 500 sheets of A4 size image were output. The outputs were evaluated according to the following criteria:

A: disturbance of printing was not occurred from start to finish of the printing B: some outputs having disturbance of printing occurred C: disturbance of printing occurred from start to finish of the printing 2) With respect to the image quality, four kinds of portraits and a standard chart including a chart containing color patches corresponding to MacBeth chart for color evaluation were prepared. The printing condition of skin color of the portraits and all colors of the color patches are visually observed and their qualities were evaluated according to the following criteria:

A: Uniform and good images were formed all over

B: Beading (local unevenness of printed ink) or bronze (dullness of color) was recognized in a part of images by careful observation C: Beading or bronze was clearly recognized in the images 3) With respect to the fastness of image, printed samples were evaluated in the following manner.

(1) Light Fastness:

Image density (Ci) of the sample just after the printing was measured by X-rite 310. The sample was irradiated with xenon light (indoor sunlight defined in ISO, 85,000 lux) using Weather-O-Meter (manufactured by Atlas Electric Co., Ltd.) for 14 days and then image density (Cf) of the sample was measured to determine a dye remaining ratio (Cf/Ci×100), whereby the light-fastness was evaluated. The dye remaining ratios were determined at 3 points having the reflection density of 1, 1.5 and 2 respectively, and a case wherein the dye remaining ratios were not less than 70% at all three points was designated as A, a case wherein the dye remaining ratio were less than 70% at two points was designated as B and a case wherein the dye remaining ratio were less than 70% at all three points was designated as C.

(2) Heat Fastness:

Reflection density of the sample was measured by X-rite 310 before and after preservation of the sample under conditions of 80° C. and 70% RH for 10 days and a dye remaining ratio was determined in the same manner as above, whereby the heat-fastness was evaluated. The dye remaining ratio were determined at 3 points having the reflection density of 1, 1.5 and 2 respectively, and a case wherein the dye remaining ratio were not less than 90% at all three points was designated as A, a case wherein the dye remaining ratio were less than 90% at two points was designated as B and a case wherein the dye remaining ratio were less than 90% at all three points was designated as C.

(3) Ozone Fastness

Reflection density of the Photo Gloss Paper having the images formed was measured by X-rite 310 before and after allowing to stand in a box set 5 ppm of an ozone gas concentration for 5 days and a dye remaining ratio was determined in the same manner as above. The dye remaining ratio were determined at 3 points having the reflection density of 1, 1.5 and 2.0 respectively. The ozone gas concentration in the box was set using an ozone gas monitor (Model OZG-EM-01 manufactured by Applics Co., Ltd.). A case wherein the dye remaining ratio were not less than 80% at all three points was designated as A, a case wherein the dye remaining ratio was less than 80% at one or two points was designated as B and a case wherein the dye remaining ratio were less than 70% at all three points was designated as C.

The results obtained are shown in the following table.

| No. | Ejection Stability | Image Quality | Light Fastness | Heat Fastness | Ozone Fastness |
| --- | --- | --- | --- | --- | --- |
| PM-950C (Reference example) | A | A | B | B | C |
| 101 (Comparative example) | A | A | A | A | B |
| 102 (Comparative example) | A | A | A | A | B |
| 103 (Comparative example) | A | A | A | A | B |
| 104 (Comparative example) | A | A | A | A | B |
| 105 (Invention) | A | A | A | A | A |
| 106 (Invention) | A | A | A | A | A |
| 107 (Invention) | A | A | A | A | A |
| 108 (Invention) | A | A | A | A | A |
| 109 (Invention) | A | A | A | A | A |

From the results shown in the table above, the systems using the ink according to the invention are superior to the comparative examples in all properties of the light fastness, heat fastness and ozone fastness regarding the fastness of image and excellent in the image quality and exhibit good ejection stability.

Further, when the ink and ink set according to the invention were used in a thermal inkjet type (ink droplet ejection type by heating) inkjet printer, the same results were obtained.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. An inkjet ink comprising at least one dye having a heterocyclic ring and a metal ion in an aqueous medium, wherein the ink jet ink further comprises a compound capable of accelerating aggregation of the dye in the aqueous medium.

2. The inkjet ink as claimed in claim 1, wherein the dye having a heterocyclic ring and a metal ion is a phthalocyanine dye.

3. The inkjet ink as claimed in claim 1, wherein the compound capable of accelerating aggregation of the dye in the aqueous medium is at least one compound selected from heterocyclic or chain-like low molecular weight compounds that may be substituted with a hydroxy group, an amino group or a thiazolyl group.

4. The inkjet ink as claimed in claim 1, wherein the dye having a heterocyclic ring and a metal ion is at least one of dyes represented by formula (I) shown below:

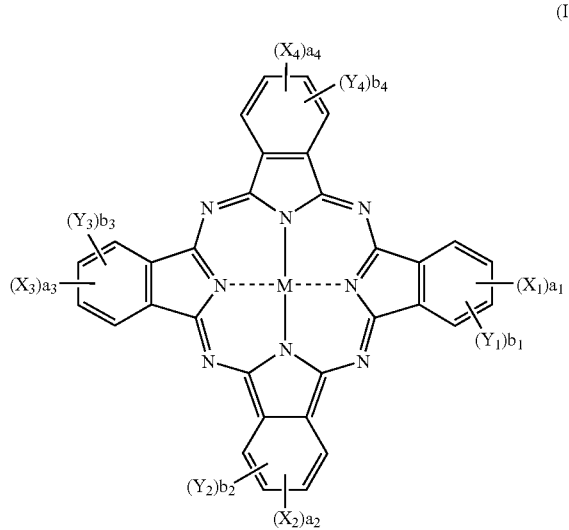

(I)

wherein, $X_1$, $X_2$, $X_3$ and $X_4$ each independently represent —SO-Z, —SO$_2$-Z, —SO$_2$NR$_1$R$_2$, a sulfo group, —CONR$_1$R$_2$ or —CO$_2$R$_1$; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; R$_1$ and R$_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group; when two or more Zs are present, these may be the same or different from each other; $Y_1$, $Y_2$, $Y_3$ and $Y_4$ each independently represent a monovalent substituent; when two or more of any one of $X_1$s to $X_4$s and $Y_1$s to $Y_4$s are present, these may be the same or different from each other; $a_1$, $a_2$, $a_3$ and $a_4$ and $b_1$, $b_2$, $b_3$ and $b_4$ represent numbers of substituents represented by $X_1$ to $X_4$ and $Y_1$ to $Y_4$, respectively; $a_1$ to $a_4$ each independently represent an integer of from 0 to 4, provided that all of $a_1$ to $a_4$ are not 0 at the same time; $b_1$ to $b_4$ each independently represent an integer of from 0 to 4; and M represents a hydrogen atom, a metal element or an oxide, hydroxide or halide thereof.

5. The inkjet ink as claimed in claim 4, wherein the dye represented by formula (I) is a dye represented by formula (II) shown below:

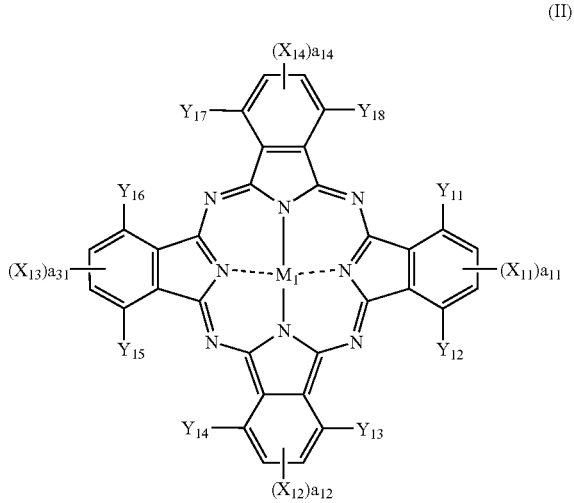

(II)

wherein, $X_{11}$, $X_{12}$, $X_{13}$, $X_{14}$, $Y_{11}$, $Y_{12}$, $Y_{13}$, $Y_{14}$, $Y_{15}$, $Y_{16}$, $Y_{17}$, $Y_{18}$ and $M_1$ have the same meanings as defined for $X_1$ to $X_4$, $Y_1$ to $Y_4$ and M in formula (I), respectively; and $a_{11}$ to $a_{14}$ each independently represent an integer of from 1 or 2.

6. The inkjet ink as claimed in claim 1, wherein the compound capable of accelerating aggregation of the dye in the aqueous medium is a compound represented by formula (K) shown below:

X-NH-C(-Y)=Z (K)

wherein, X represents a hydrogen atom, an amino group, an aryl group, a heterocyclic group, an alkenyl group, an alkynyl group or a group represented by C(=P)=Q (wherein P represents a hydrogen atom, a hydroxy group, an alkyl group, an aryl group, a heterocyclic group, an alkenyl group, an alkynyl group, an alkylamino group, an arylamino group, an alkoxy group or an aryloxy group, and Q represents an oxygen atom, a sulfur atom or a substituted nitrogen atom); Y represents a hydrogen atom, a hydroxy group, an amino group, an alkyl group, an aryl group, a heterocyclic group, an alkenyl group, an alkynyl group, an alkylamino group, an arylamino group, an alkoxy group or an aryloxy group; and Z represents an oxygen atom, a sulfur atom or a substituted nitrogen atom, or any two of X, Y and Z may be combined with each other to form a ring.

* * * * *